United States Patent
Umemoto et al.

(10) Patent No.: US 9,309,385 B2
(45) Date of Patent: Apr. 12, 2016

(54) CELLULOSE FIBERS AND PROCESS FOR PRODUCING THE SAME, CELLULOSE FIBER ASSEMBLY, AND CELLULOSE-FIBER COMPOSITE MATERIAL

(71) Applicants: MITSUBISHI CHEMICAL CORPORATION, Chiyoda-ku (JP); OJI HOLDINGS CORPORATION, Chuo-ku (JP)

(72) Inventors: Tomokazu Umemoto, Kanagawa (JP); Naohide Ogita, Kanagawa (JP); Takanori Shimizu, Kanagawa (JP); Yasutomo Noishiki, Tokyo (JP); Hiroyuki Nagatani, Tokyo (JP); Go Banzashi, Tokyo (JP)

(73) Assignee: Oji Holdings Corporation, Chuo-ku (JP)

( * ) Notice: Subject to any disclaimer, the term of this patent is extended or adjusted under 35 U.S.C. 154(b) by 0 days.

(21) Appl. No.: 13/972,408

(22) Filed: Aug. 21, 2013

(65) Prior Publication Data

US 2013/0338250 A1 Dec. 19, 2013

Related U.S. Application Data

(63) Continuation of application No. PCT/JP2012/054163, filed on Feb. 21, 2012.

(30) Foreign Application Priority Data

Feb. 21, 2011 (JP) ................................. 2011-034807
Feb. 20, 2012 (JP) ................................. 2012-034061

(51) Int. Cl.

| | | |
|---|---|---|
| *C08L 1/02* | (2006.01) | |
| *D21H 11/20* | (2006.01) | |
| *C08B 15/04* | (2006.01) | |
| *D01F 2/24* | (2006.01) | |
| *D01F 2/28* | (2006.01) | |
| *C08J 5/24* | (2006.01) | |
| *C08B 3/00* | (2006.01) | |
| *C08B 3/04* | (2006.01) | |
| *C08B 3/06* | (2006.01) | |
| *C08B 3/08* | (2006.01) | |

(52) U.S. Cl.
CPC ... *C08L 1/02* (2013.01); *C08B 3/00* (2013.01); *C08B 3/04* (2013.01); *C08B 3/06* (2013.01); *C08B 3/08* (2013.01); *C08B 15/04* (2013.01); *C08J 5/24* (2013.01); *D01F 2/24* (2013.01); *D01F 2/28* (2013.01); *D21H 11/20* (2013.01); *C08J 2333/06* (2013.01); *Y10T 428/298* (2015.01)

(58) Field of Classification Search
CPC ............ C08B 15/04; C08B 3/00; C08B 3/04; C08B 3/06; C08B 3/08; D01F 2/24; D01F 2/28; C08L 1/02
USPC .............. 522/18; 428/401; 536/63, 67, 68, 69
See application file for complete search history.

(56) References Cited

U.S. PATENT DOCUMENTS

| | | | | |
|---|---|---|---|---|
| 1,880,420 | A * | 10/1932 | Clarke et al. ..................... | 536/64 |
| 2,363,091 | A * | 11/1944 | Seymour et al. ................. | 536/64 |
| 4,590,265 | A * | 5/1986 | Bogan et al. ..................... | 536/63 |
| 5,973,139 | A * | 10/1999 | Lee et al. ......................... | 536/63 |
| 7,879,994 | B2 * | 2/2011 | Buchanan et al. ............... | 536/64 |
| 2002/0086990 | A1 * | 7/2002 | Kumar et al. .................... | 536/63 |
| 2010/0272980 | A1 | 10/2010 | Kowata et al. | |
| 2011/0274908 | A1 | 11/2011 | Kowata et al. | |

FOREIGN PATENT DOCUMENTS

| | | |
|---|---|---|
| CN | 1295581 A | 5/2001 |
| CN | 1886427 A | 12/2006 |
| CN | 101932416 A | 12/2010 |
| EP | 2226171 A1 | 9/2010 |
| JP | 2008-001728 | 1/2008 |
| JP | 2009-155772 | 7/2009 |
| JP | 2009-161896 | 7/2009 |
| JP | 2009-299043 | 12/2009 |
| JP | 2010-254726 | 11/2010 |
| JP | 2011-099064 | 5/2011 |
| WO | WO 0039167 A1 * | 7/2000 |
| WO | WO 2005054297 A2 * | 6/2005 |
| WO | 2009/081881 A1 | 7/2009 |

OTHER PUBLICATIONS

International Search Report issued Apr. 24, 2012 in PCT/JP2012/054163 filed Feb. 21, 2012.
Chinese Office Action issued on Feb. 28, 2015 in corresponding Chinese patent application No. 201280009608 with English translation.
Extended European Search Report issued on Jul. 23, 2015 in Patent Application No. 12749121.5.
Combined Chinese Office Action and Search Report issued Aug. 21, 2015 in Patent Application No. 201280009608.X (with English language translation).
Notification of Reasons for Refusal issued Jan. 5, 2016, in Japanese Patent Application No. 2012-034061 filed Feb. 20, 2012 (with English translation).

* cited by examiner

*Primary Examiner* — Liam J Heincer
*Assistant Examiner* — Nicholas Hill
(74) *Attorney, Agent, or Firm* — Oblon, McClelland, Maier & Neustadt, L.L.P.

(57) ABSTRACT

The present invention relates to cellulose fibers wherein a part of the hydroxyl groups of the cellulose have been substituted with at least one of a carboxy group and formyl group of 0.1 mmol/g or larger based on the weight of the cellulose fibers, and have been further substituted with a chemical modification group other than the carboxy and formyl groups.

10 Claims, No Drawings

CELLULOSE FIBERS AND PROCESS FOR PRODUCING THE SAME, CELLULOSE FIBER ASSEMBLY, AND CELLULOSE-FIBER COMPOSITE MATERIAL

TECHNICAL FIELD

The present invention relates to cellulose fibers in which a part of the hydroxyl groups of the cellulose have been substituted with at least one of a carboxy group and formyl group. More particularly, the invention relates to cellulose fibers useful for cellulose-fiber composite materials obtained by compositing with resins, and to a process for producing the cellulose fibers, a cellulose fiber assembly including the cellulose fibers, and a cellulose-fiber composite material.

BACKGROUND ART

Composite materials including microfibers of cellulose are being investigated enthusiastically in recent years. It is known that cellulose brings about a low coefficient of linear expansion, high modulus of elasticity, and high strength because of the extended-chain crystals thereof. Furthermore, composite materials obtained by compositing microfined cellulose with a resin are attracting attention as materials which show high transparency.

Examples of applications of such composite materials of cellulose fibers (cellulose-fiber composite materials) having high transparency and a low coefficient of linear expansion include transparent substrate materials for electrical/electronic devices represented by flat-panel displays, OLED illuminators, solar cell panels, etc. However, there are cases where in steps for producing such devices, the transparent substrate materials are required to undergo a heat treatment. For use in these applications, materials which take a color upon the heat treatment are undesirable.

Namely, in order for those cellulose-fiber composite materials to be utilized industrially, all of the following requirements must be satisfied:

the cellulose fibers to be used have excellent suitability for fibrillation;

the cellulose fibers, when composited with a resin, give a composite material which is capable of retaining high transparency; and the cellulose-fiber composite material does not take a color even when subjected to a heat treatment.

Patent document 1 discloses a process for producing microfibers of cellulose by subjecting raw cellulose fibers constituted of purified wood flour to a fibrillation treatment with a high-pressure homogenizer. Patent document 2 discloses a process for producing microfibers of cellulose by conducting a fibrillation treatment using an ultrasonic propagator.

Methods for enhancing fibrillation by using a chemical treatment in combination with any of those fibrillation techniques based on a physical treatment have also been reported. For example, patent document 3 discloses a technique for providing cellulose fibers having enhanced dispersibility in water and excellent suitability for fibrillation, by introducing carboxy groups into cellulose fibers by utilizing an oxidation reaction of the surface of cellulose with an N-oxyl compound. This method, however, is undesirable because the production cost is high since the N-oxyl compound to be used for the cellulose oxidation is generally expensive, the oxidation reaction necessitates many kinds of chemicals, and the production steps are complicated.

Patent document 4 discloses a method for enhancing suitability for fibrillation by conducting a chemical treatment in which cellulose fibers are treated with ozone. The ozone treatment of cellulose has hitherto been used as bleaching in pulp production, and is one of the inexpensive methods of industrial oxidation.

Patent document 5 discloses a technique for obtaining a composite material which can be inhibited from taking a color upon heating, by using nonwoven cellulose fabric in which the hydroxyl groups have been chemically modified.

PRIOR-ART DOCUMENTS

Patent Documents

Patent Document 1: JP-A-2009-155772
Patent Document 2: JP-A-2009-299043
Patent Document 3: JP-A-2008-1728
Patent Document 4: JP-A-2010-254726
Patent Document 5: JP-A-2009-161896

SUMMARY OF THE INVENTION

Problems that the Invention is to Solve

However, cellulose-fiber composite materials produced using the microfibers of cellulose obtained by the production processes described in patent documents 1 to 4 were found to have a problem that the composite materials take a color considerably upon heating.

Meanwhile, the method in which cellulose fibers are formed into nonwoven fabric and then chemically modified, as described in patent document 5, is undesirable because the production cost is high since special production equipment for chemically modifying the nonwoven fabric is necessary. Although patent document 5 includes a statement to the effect that cellulose fibers which have not been microfined may be subjected to the chemical modification, it was found that the chemically modified cellulose fibers are in a highly hydrophobic state and have a problem that these cellulose fibers are apt to sediment in the aqueous dispersion and are difficult to microfine.

Accordingly, a subject for the invention is to provide cellulose fibers which have an excellent suitability for fibrillation, have an excellent transparency when composited with resins, and are less apt to pose a problem concerning coloring when heated. Other subjects are to provide a production process for obtaining such cellulose fibers and to provide a cellulose-fiber composite material which includes the cellulose fibers.

Means for Solving the Problems

The present inventors diligently made investigations and, as a result, have found that the problems described above can be overcome by using cellulose fibers in which a part of the hydroxyl groups of the cellulose have been substituted with at least one of a carboxy group and formyl group, the amount of the at least one of a carboxy group and formyl group being 0.1 mmol/g or larger based on the weight of the cellulose fibers, and have been further substituted with a chemical modification group of other than carboxy and formyl groups. In addition, the inventors have found that these cellulose fibers bring about an unexpected effect that a cellulose-fiber composite material produced using the cellulose fibers has a low coefficient of linear expansion. The invention has been thus completed.

The invention is as follows.

1. Cellulose fibers wherein
    a part of the hydroxyl groups of the cellulose
    has been substituted with at least one of a carboxy group and formyl group of 0.1 mmol/g or larger based on the weight of the cellulose fibers, and
    has been further substituted with a chemical modification group other than the carboxy and formyl groups.
2. The cellulose fibers according to the item 1 above, which have a degree of substitution with the chemical modification group of 0.05 or higher.
3. The cellulose fibers according to the item 1 or 2 above, wherein a glucose which constitutes the cellulose has been substituted at the 2- or 3-position with at least one of a carboxy group and formyl group.
4. The cellulose fibers according to any one of the items 1 to 3 above, wherein the at least one of the carboxy group and formyl group has been introduced by an oxidation treatment.
5. The cellulose fibers according to any one of the items 1 to 4 above, wherein the chemical modification group is at least one of an acyl group and alkyl group.
6. The cellulose fibers according to any one of the items 1 to 5 above, wherein the cellulose fibers are raw cellulose fibers obtained by purifying a cellulose-containing material, and
    a part of the hydroxyl groups of the raw cellulose fibers has been substituted with the at least one of a carboxy group and formyl group and with the chemical modification group.
7. The cellulose fibers according to any one of the items 1 to 5 above, which have a number-average fiber diameter of 2-400 nm.
8. A cellulose fiber assembly comprising the cellulose fibers according to any one of the items 1 to 7 above.
9. A cellulose-fiber composite material comprising the cellulose fibers according to any one of the items 1 to 7 above and a matrix material.
10. A process for producing cellulose fibers, which comprises subjecting raw cellulose fibers to an oxidation treatment, a chemical modification treatment, and a fibrillation treatment.

Effects of the Invention

According to the invention, cellulose fibers which have excellent suitability for fibrillation, bring about excellent transparency when composited with resins, and are less apt to pose a problem concerning coloring when heated are provided. Consequently, the cellulose-fiber composite material including the cellulose fibers of the invention is highly transparent and has low linear expansibility and high strength. In addition, this composite material is inhibited from taking a color when the base material or the like is heat-treated during processing. This composite material is useful in applications such as, for example, transparent substrate materials for electrical/electronic devices represented by flat panel displays, OLED illuminators, solar cell panels, etc.

MODES FOR CARRYING OUT THE INVENTION

Modes for carrying out the invention will be explained below in detail. However, the following explanations on constituent elements are for embodiments (representative embodiments) of the invention, and the invention should not be construed as being limited to the embodiments.

The cellulose fibers of the invention are characterized in that the hydroxyl groups of the cellulose have been partly substituted with at least one of a carboxy group and formyl group, the proportion of the at least one of a carboxy group and formyl group being 0.1 mmol/g or more based on the weight of the cellulose fibers, and that other part of the hydroxyl groups of the cellulose have been substituted with chemical modification group other than carboxy and formyl groups.

The term "cellulose fibers" in the invention means any fibrous cellulose, and includes all of various forms including, for example, the following (1) to (3). Preferred examples of the cellulose fibers include raw cellulose fibers and fibrillated cellulose fibers having a number-average fiber diameter of 2-400 nm.

(1) Raw cellulose fibers obtained by purifying a cellulose-containing material such as wood flour (2) Fibrillated cellulose fibers which will be described later, that have a number-average fiber diameter of 2-400 nm (3) A cellulose fiber assembly obtained from the fibrillated cellulose fibers through, for example, filtration The term "weight of cellulose fibers" means the weight of cellulose fibers which have been sufficiently dried and are in the absolute dry state. Namely, that term means "dry weight of cellulose fibers".

1. Process for Producing the Cellulose Fibers

First, the cellulose fibers of the invention are explained with respect to a process for production thereof. The cellulose fibers of the invention are characterized in that part of the hydroxyl groups of the cellulose have been substituted with at least one of a carboxy group and formyl group, the amount of the at least one of a carboxy group and formyl group being 0.1 mmol/g or larger based on the weight of the cellulose fibers, and that other part of the hydroxyl groups of the cellulose have been substituted with chemical modification group other than carboxy and formyl groups.

Although the cellulose fibers of the invention may be produced by any production process, it is preferred to produce the cellulose fibers by the cellulose fiber production process of the invention described below in detail, which is characterized by subjecting raw cellulose fibers to an oxidation treatment, a chemical modification treatment, and a fibrillation treatment.

When the cellulose fibers of the invention are produced, the oxidation treatment, chemical modification treatment, and fibrillation treatment of raw cellulose fibers may be conducted in any order, and there are no particular limitations on the sequence of the treatments. It is, however, preferred to conduct the chemical modification treatment after the oxidation treatment as will be described later, from the standpoint of avoiding a trouble that the chemical modification groups introduced by a chemical modification treatment are eliminated by an oxidation treatment. Consequently, with respect to orders of the oxidation treatment, chemical modification treatment, and fibrillation treatment in the cellulose fiber production process of the invention, it is preferred to employ the orders shown below as (1) to (3).

(1) Oxidation treatment→chemical modification treatment→fibrillation treatment (2) Fibrillation treatment→oxidation treatment→chemical modification treatment (3) Oxidation treatment→fibrillation treatment→chemical modification treatment Especially in the case where a fibrillation treatment is conducted prior to other treatment(s), as in (2) and (3) among those orders, the dehydration by filtration which is performed in, for example, a washing operation requires much time because the cellulose fibers are in a microfined state. From this standpoint, order (1) is preferred. However, orders of the treatments should not be construed as being limited to that order.

Raw cellulose fibers which have been obtained by subjecting raw cellulose fibers to an oxidation treatment and a chemical modification treatment in accordance with order (1) and which have not undergone a fibrillation treatment are also cellulose fibers of the invention.

Incidentally, with respect to patent document 5, which was cited above, the following explanation was given above: when cellulose fibers which have undergone chemical modification are microfined, the chemically modified cellulose fibers are in a highly hydrophobic state and apt to sediment in the aqueous dispersion and are difficult to microfine. In contrast, in the invention, since not only chemical modification groups have been introduced by a chemical modification treatment but also at least one of a carboxy group and formyl group have been introduced in a given amount into the cellulose fibers, the cellulose fibers retain hydrophilic properties, show satisfactory dispersibility in water, and are free from that problem. Consequently, a fibrillation treatment can be efficiently given also to the raw cellulose fibers which have undergone an oxidation treatment and a chemical modification treatment.

Furthermore, the oxidation treatment and chemical modification treatment which will be described later can be given also to cellulose fibers obtained as a cellulose fiber assembly in accordance with the process for cellulose fiber assembly production which will be described later. It is also possible to use a method in which cellulose fibers that have undergone an oxidation treatment and a fibrillation treatment only are obtained as a cellulose fiber assembly and then subjected to a chemical modification treatment. In this case also, the cellulose fibers in the cellulose fiber assembly into which not only a given amount of at least one of a carboxy group and formyl group have been introduced by the oxidation treatment, etc. but also chemical modification groups other than carboxy and formyl groups have been introduced by the chemical modification treatment are cellulose fibers of the invention.

<Raw Cellulose Fibers>

In the invention, raw cellulose fibers are a material obtained by removing impurities from a cellulose-containing material, such as those shown below, through general purification steps.

(Cellulose-Containing Materials)

Examples of the cellulose-containing material include woody materials such as softwood and hardwood, cotton such as cotton linters and cotton lint, lees of the pressing of sugar canes, sugar beets, or the like, bast fibers from hemp, ramie, jute, kenaf, etc., venous fibers from sisal, pineapple, etc., petiolar fibers from Manila hemp, banana, etc., fruit fibers from coconuts, etc., cane fibers from bamboo, etc., bacterial cellulose, which is produced by bacteria, seaweeds such as Valoniaceae and Cladophorales, and the tunicae of sea squirts.

These natural cellulosic materials are preferred because these materials are highly crystalline and hence impart a low coefficient of linear expansion and a high modulus of elasticity. Bacterial cellulose is preferred from the standpoint that cellulose fibers having a fine fiber diameter are easy to obtain therefrom. Cotton is also preferred from the standpoints that cellulose fibers having a fine fiber diameter are easy to obtain therefrom and that the raw materials are easily available. Furthermore, cellulose fibers having a fine fiber diameter are obtained also from woody materials such as softwood or hardwood. In addition, such woody materials are the most abundant biomass resources on the globe and are sustainable resources which are said to be produced in an amount of about seventy billion tons or more annually. Woody materials hence contribute considerably to a reduction of carbon dioxide emission, which affects global warming, and are superior from the standpoint of profitability. Such a cellulose-containing material is subjected to general purification steps to obtain the raw cellulose fibers according to the invention.

(Methods for Purifying Cellulose-Containing Material)

The raw cellulose fibers to be used in the invention are obtained by purifying, by an ordinary method, a cellulose-containing material of any of the origins shown above.

Examples of methods for purifying a cellulose-containing material include a method in which the cellulose-containing material is degreased with a benzene/ethanol mixed solvent or an aqueous sodium carbonate solution, subsequently delignified with a chlorous acid salt (Wise's method), and subjected to a hemicellulose removal treatment with an alkali.

Besides Wise's method, examples of purification methods further include the following holocellulose production processes: a method in which peracetic acid is used (pa method); a method in which a peracetic acid/persulfuric acid mixture is used, that is, peracetic acid and persulfuric acid are used in combination (pxa method); and a chlorine/monoethanolamine method. In addition, a bleaching treatment and the like may be further conducted suitably.

Alternatively, a cellulose-containing material can be purified in accordance with a general process for producing a chemical pulp, for example, a process for producing a kraft pulp, sulfide pulp, alkali pulp, or nitric-acid pulp. Moreover, use may be made of a method in which a cellulose-containing material is heated with a digester to conduct treatments including delignification and further subjected to a bleaching treatment, etc.

Namely, examples of the raw cellulose fibers include a hardwood kraft pulp, softwood kraft pulp, hardwood sulfite pulp, softwood sulfite pulp, hardwood bleached kraft pulp, softwood bleached kraft pulp, and linter pulp.

The cellulose-containing material may be crushed or ground into wood chips, wood flour, etc., and this crushing or grinding may be performed at any timing, i.e., either before, during, or after the purification treatment.

There are no particular limitations on the degree of purification of the raw cellulose fibers obtained by purifying a cellulose-containing material. However, a low fat or lignin content and a high cellulose component content are preferred because the raw cellulose fibers having such content values are less apt to take a color. The cellulose component content of the raw cellulose fibers obtained by purifying a cellulose-containing material is preferably 80% by weight or higher, more preferably 90% by weight or higher, even more preferably 95% by weight or higher.

The cellulose components can be classified into a crystalline α-cellulose component and a noncrystalline hemicellulose component. Raw cellulose fibers in which the proportion of crystalline α-cellulose is high, are preferred because the effect of bringing about a low coefficient of linear expansion, high modulus of elasticity, and high strength is apt to be obtained when the raw cellulose fibers are used to produce a cellulose-fiber composite material.

In the raw cellulose fibers obtained by purifying a cellulose-containing material, the proportion (by weight) of α-cellulose to noncrystalline hemicellulose is preferably 90/10 or larger, more preferably 95/5 or larger, even more preferably 97/3 or larger. Namely, it is preferred that the proportion of α-cellulose should be high.

(Fiber Diameter of the Raw Cellulose Fibers)

The fiber diameter of the raw cellulose fibers to be used in the invention is not particularly limited. It is, however, preferred that the number-average fiber diameter thereof should be 1 μm to 1 mm. Raw cellulose fibers which have undergone general purification have a number-average fiber diameter of about 50 μm. For example, in the case of cellulose obtained by purifying a raw material having a size of several centimeters, e.g., chips, it is preferred that the cellulose should be subjected to a mechanical treatment with a macerator, e.g., a refiner or a beater, to regulate the number-average fiber diameter thereof to about 50 μm.

<Oxidation Treatment>

By subjecting the raw cellulose fibers to an oxidation treatment, part of the hydroxyl groups of the cellulose can be substituted with at least one of a carboxy group and formyl group, the amount of the at least one of a carboxy group and formyl group being 0.1 mmol/g or larger based on the weight of the cellulose fibers.

Usually, in raw cellulose fibers which underwent a purification treatment, a small proportion of the hydroxyl groups of the cellulose have been substituted with at least one of a carboxy group and formyl group. However, the amount of the at least one of a carboxy group and formyl group does not exceed 0.1 mmol/g. Even when such raw cellulose fibers which have at least one of a carboxy group and formyl group in an amount less than 0.1 mmol/g are used, the effects of the invention cannot be obtained.

It is presumed that when part of the hydroxyl groups in the cellulose are oxidized to carboxy groups, the surface of each cellulose fiber is covered with the negative charge of the carboxy groups and repulsive force generates between the cellulose fibers, and that the repulsion produces the effects of improving dispersibility in dispersion media and enhancing suitability for fibrillation.

Meanwhile, it is presumed that when part of the hydroxyl groups are oxidized to formyl groups, the power of bonding between the cellulose fibers is lessened since formyl groups have lower power of hydrogen bonding than hydroxyl groups, resulting in the effect of enhancing suitability for fibrillation.

It should be noted that although the cellulose fibers of the invention are cellulose fibers in which part of the hydroxyl groups of the cellulose have been substituted with 0.1 mmol/g or more of at least one of a carboxy group and formyl group based on the weight of the cellulose fibers, the amount of 0.1 mmol/g or more is the total amount of the carboxy and formyl groups, and the amount of 0.1 mmol/g or more may be either the amount of carboxy groups alone, or the amount of formyl groups alone, or the amount of both carboxy groups and formyl groups.

In the cellulose fibers of the invention, part of the hydroxyl groups of the cellulose have been substituted with at least one of a carboxy group and formyl group, the amount of the at least one of a carboxy group and formyl group based on the weight of the cellulose being 0.1 mmol/g or larger, preferably 0.15 mmol/g or larger, and being usually desirably 3 mmol/g or less, more desirably 1.5 mmol/g or less, preferably 1.2 mmol/g or less, especially preferably 1 mmol/g or less, more preferably 0.5 mmol/g or less, even more preferably 0.3 mmol/g or less, most preferably 0.2 mmol/g or less.

When the proportion in which part of the hydroxyl groups have been substituted with at least one of a carboxy group and formyl group is not less than the lower limit, it is possible to sufficiently obtain the effect of improving suitability for fibrillation which is brought about by the introduction of at least one of a carboxy group and formyl group into the cellulose fibers. However, in case where the amount of the carboxy and/or formyl groups is too large, the cellulose fibers have significantly reduced heat resistance and take a color considerably upon heating. It is thought that so long as the amount of the carboxy and/or formyl groups is not larger than the upper limit, coloring inhibition by a chemical modification is possible. Such amounts of the carboxy and/or formyl groups are hence preferred.

In the case where hydroxyl groups of the cellulose have been substituted with both carboxy groups and formyl groups, it is preferred that the amount of the carboxy groups should be larger. Specifically, the ratio of the amount of the carboxy groups to that of the formyl groups, in terms of molar ratio, is preferably 2 times or more, more preferably 5 times or more, even more preferably 10 times or more. There may be no formyl groups, and carboxy groups only may be introduced by the treatment. In case where the amount of formyl groups is too large, it is presumed that undesirable results are brought about, such as, for example, the case where enhanced coloring occurs when the cellulose is heated.

It is preferred that the at least one of a carboxy group and formyl group should have been introduced as substituents not only at specific positions in the glucose which constitutes the cellulose but also at any other position(s). When some methods of oxidation treatment are employed, at least one of a carboxy group and formyl group can be introduced only at specific positions. For example, there is a method in which it is difficult to introduce the groups at the 2- or 3-position in the glucose. In the invention, however, it is preferred that at least one of a carboxy group and formyl group have been introduced also at the 2- or 3-position. It is presumed that the substituent introduction at any position brings about the effect that the replacement with a smaller amount of at least one of a carboxy group and formyl group causes repulsive force between the cellulose fibers and thereby enhances suitability for fibrillation.

An oxidation treatment of raw cellulose fibers is described below. However, cellulose fibers of the invention can be obtained also by giving the following oxidation treatment to the fibrillated cellulose fibers or cellulose fiber assembly which will be described later.

Specific methods for the oxidation treatment are not particularly limited. Examples thereof include a method in which raw cellulose fibers are brought into contact with a gas having oxidizing properties (hereinafter referred to as oxidizing gas) and a method in which the oxidation treatment is conducted by suspending or immersing raw cellulose fibers in a solution containing an oxidizing chemical species.

(Method in which Oxidizing Gas is Contacted with Raw Cellulose Fibers)

The method in which an oxidizing gas is contacted with raw cellulose fibers can be carried out by the following method (1) or (2).

(1) The raw cellulose fibers are held for a given period in an atmosphere in which an oxidizing gas is present.

(2) The raw cellulose fibers are exposed to a stream of an oxidizing gas.

Various conditions including the amount of the oxidizing gas to be added, treatment temperature, and treatment period in the contact between the raw cellulose fibers and the oxidizing gas can be suitably determined according to the desired amount of the at least one of a carboxy group and formyl group to be introduced into the cellulose fibers.

In the case of the method in which the raw cellulose fibers are held for a given period in an atmosphere in which an oxidizing gas is present, the atmosphere in which an oxidizing gas is present is not particularly limited so long as an oxidizing gas is present in the atmosphere in an amount of usually preferably 10 ppm or larger, more preferably 100 ppm or larger, even more preferably 1,000 ppm or larger. One or more gases other than the oxidizing gas may coexist.

The given period is usually preferably 30 seconds or longer, more preferably 1 minute or longer, and is usually preferably 24 hours or less, preferably 10 hours or less.

Also in the case where the raw cellulose fibers are exposed to a stream of an oxidizing gas, the stream is not particularly limited so long as an oxidizing gas is present in the stream in an amount of usually preferably 10 ppm or larger, more preferably 100 ppm or larger, even more preferably 1,000 ppm or larger. One or more gases other than the oxidizing gas may coexist.

Also in the case where the raw cellulose fibers are exposed to a stream of an oxidizing gas, it is preferred to expose the raw cellulose fibers for a given period as in the case where the raw cellulose fibers are held for a given period in an atmosphere in which an oxidizing gas is present. The exposure period is usually preferably 30 seconds or longer, more preferably 1 minute or longer, and is usually preferably 24 hours or less, more preferably 10 hours or less.

The oxidizing gas is not particularly limited, and examples thereof include ozone, oxygen gas, chlorine gas, fluorine gas, chlorine dioxide, and nitrous oxide. The oxidizing gas may be composed of two or more of these gases. In particular, ozone is preferred because ozone can be evolved in situ in a necessary amount on occasion by supplying air, oxygen gas, or an oxygen-containing gas, e.g., oxygen-enriched air, to an ozone generator and because the ozone generator is commercially available and easy to utilize.

In the case where the atmosphere in which an oxidizing gas is present or the stream of an oxidizing gas further contains a gas other than the oxidizing gas, the coexistent gas may be any gas which does not inhibit oxidation of hydroxyl groups of the cellulose. Examples thereof include air, oxygen gas, nitrogen gas, carbon dioxide, and argon gas, and two or more thereof may be contained.

Preferred conditions in the case of using ozone as the oxidizing gas are described below. The amount of ozone to be added, based on the dry mass of the raw cellulose fibers, is preferably 0.1-1,000% by weight, more preferably 1-100% by weight, even more preferably 5-50% by weight. This amount of ozone to be added corresponds to the total mass of the ozone used in the following ozone treatment of the raw cellulose fibers.

The raw cellulose fibers to be subjected to contact with ozone (hereinafter sometimes referred to as ozone treatment) may be in a completely dry state, or may be in the state of being wet with a dispersion medium, e.g., water, or may be in the state of a dispersion obtained by dispersing the raw cellulose fibers in a dispersion medium such as water (cellulose fiber dispersion). Since a larger area of contact between ozone and the raw cellulose fibers results in an increase in the efficiency of oxidation, it is more preferred, in the case of using a cellulose fiber dispersion, that ozone gas should be bubbled into the dispersion.

Regardless of whether the raw cellulose fibers are in the state of being wet with a dispersion medium or in the state of a cellulose fiber dispersion, a higher solid concentration of the raw cellulose fibers results in an increase in the efficiency of oxidation. Consequently, the solid concentration of the raw cellulose fibers in the wet raw cellulose fibers or cellulose fiber dispersion to be subjected to the ozone treatment is preferably 5% by weight or higher, more preferably 20% by weight or higher, even more preferably 40% by weight or higher.

When metallic-element-containing substances have come into the raw cellulose fibers, there are cases where the self-decomposition reaction of the ozone is accelerated, resulting in a decrease in the efficiency of oxidation. Consequently, it is more preferred that the raw cellulose fibers to be subjected to the ozone treatment should be washed with an acidic aqueous solution, such as dilute sulfuric acid, dilute nitric acid, or dilute hydrochloric acid, to remove the metallic-element-containing substances therefrom beforehand.

With respect to temperature for the ozone treatment, the atmosphere has a temperature of preferably 0-100°, more preferably 20-50°. By regulating the treatment temperature so as to be not lower than the lower limit, it is rendered possible to prevent the trouble that the raw cellulose fibers in the state of being wet with water or the cellulose fiber dispersion suffers freezing, etc., resulting in difficulties in sample handling. By regulating the treatment temperature so as to be not higher than the upper limit, the self-decomposition reaction of the ozone can be inhibited and the efficiency of the oxidation can be improved.

During the ozone treatment, ultraviolet irradiation may be conducted. Irradiation of the ozone with ultraviolet rays, in particular, with ultraviolet rays having wavelengths of 250 nm or less, is more preferred because this irradiation heightens the reactivity of the ozone to heighten the oxidation efficiency.

It is preferred that the raw cellulose fibers which have undergone the oxidation treatment, e.g., the ozone treatment, should be suspended in and washed with water sufficiently. For example, the treated raw cellulose fibers are sufficiently washed until the pH of the washings comes to be in the range of 4-9.

(Method in which Oxidation Treatment is Conducted by Suspending or Immersing Raw Cellulose Fibers in Solution Containing Oxidizing Chemical Species)

The oxidation treatment may be conducted by suspending or immersing the raw cellulose fibers in a solution which contains an oxidizing chemical species.

As the oxidizing chemical species, use can be generally made of a reagent capable of oxidizing alcohols into aldehydes or carboxylic acids. Such a reagent is not particularly limited. Examples thereof include hydrogen peroxide, peracetic acid, persulfuric acid, percarbonic acid, permanganic acid, various organic peroxy acids, chlorine dioxide, perchloric acid, chloric acid, chlorous acid, hypochlorous acid, aqueous solutions of salts or other forms of these acids, chromic-acid-based oxidizing reagents such as hexavalent chromic acid/sulfuric acid mixtures, Jones' reagent (chromic anhydride solution acidified with sulfuric acid), and pyridilinium chlorochromate (PCC reagent), activated dimethyl sulfoxide reagents for use in Swern oxidation, etc., and N-oxyl compounds which cause catalytic oxidation, such as tetrapropylammonium terrutenate (TPAP) and 2,2,6,6-tetramethylpiperidine-1-oxyl (TEMPO). In particular, oxidation of the cellulose fibers with TEMPO is known to proceed in aqueous dispersions under mild conditions, and is preferred.

When the raw cellulose fibers are suspended or immersed in a solution containing an oxidizing chemical species, the raw cellulose fibers in a completely dry state may be added to the solution containing an oxidizing chemical species, or the oxidizing chemical species may be added to a dispersion of the cellulose fibers. The solvent or dispersion medium of the solution containing an oxidizing chemical species or of the cellulose fiber dispersion is usually water. However, other solvents may be contained therein.

It is preferred that the cellulose fibers which have undergone the oxidation treatment should be suspended in and washed with water and/or an organic solvent sufficiently.
(Additional Oxidation Treatment)

Examples of additional oxidation treatments include: a method in which the raw cellulose fibers are brought into contact with an oxidizing gas; and a method in which a step for oxidation treatment is additionally performed after the oxidation treatment conducted by suspending or immersing raw cellulose fibers in a solution containing an oxidizing chemical species. The addition of oxidation treatment is more preferred because the formyl groups in the cellulose fibers can be oxidized to carboxy groups and this conversion brings about the effects of further improving suitability for fibrillation and inhibiting coloring during heating. For example, the cellulose fibers are sufficiently washed until the pH of the resultant water and/or organic solvent obtained as washings comes to be in the range of 4-9.

The chemical species to be used in the additional oxidation treatment is not particularly limited, and examples thereof include chlorous acid salts such as sodium chlorite. Specifically, the additional oxidation treatment of the raw cellulose fibers which have undergone the oxidation treatment described above can be carried out by suspending the raw cellulose fibers in, for example, a solution prepared by adding hydrochloric acid, acetic acid, or the like to a 0.1-5% by weight aqueous solution of sodium chlorite to adjust the pH thereof to 4-5 and holding the suspended raw cellulose fibers for a given period, e.g., 1-100 hours. The temperature during this additional oxidation treatment is usually preferably 0-100° C., more preferably 20-80° C., for the same reasons as in the ozone treatment.

It is preferred that the raw cellulose fibers which have undergone the additional oxidation treatment should be suspended in and washed with water sufficiently. In case where the raw cellulose fibers are stored in a strongly acidic or strongly basic state, there is a possibility that the cellulose might decrease in crystallinity, making it impossible to obtain a low coefficient of linear expansion when the thus-stored cellulose fibers are used to produce a cellulose-fiber composite material. It is therefore preferred that when the raw cellulose fibers are washed, the washing operation should be repeated until the pH of the resultant washings comes to be in the range of 4-9.
(Method for Determining the Amount of Carboxy Groups and Formyl Groups in the Cellulose Fibers)

In the invention, the amount of carboxy groups and formyl groups (mmol/g) in the cellulose fibers, based on the weight of the cellulose fibers, is determined in the following manner.

The amount of carboxy groups is calculated using "Test Method T237 cm-08 (2008): Carboxyl Content of pulp" issued from TAPPI, U.S.A.

Specifically, the amount thereof is calculated in accordance with TAPPI T237 cm-08 (2008), except that the test liquid prepared by dissolving and diluting a mixture of sodium hydrogen carbonate ($NaHCO_3$)/sodium chloride (NaCl)=0.84 g/5.85 g by adding distilled water thereto to a total volume of 1,000 mL, among the test liquids usable in the test method, is changed by changing the solute amounts to sodium hydrogen carbonate/sodium chloride=3.36 g/23.40 g so that the concentration of the test liquid becomes substantially 4 times, for example, in order to make it possible to calculate the amount of introduced carboxy groups over a wider range, and that the difference in value calculated for the cellulose between before and after the substituent introduction is taken as the amount of the substituent introduced substantially. In this examination, absolute-dry cellulose fibers obtained by freeze drying in order to avoid the thermal alteration of cellulose which can be caused by drying by heating are used as a test sample.

The amount of formyl groups (mmol/g) is determined by subjecting the material to additional oxidation to oxidize the formyl groups contained in the sample to carboxy groups and calculating the difference in the amount of carboxy groups in the sample, which is determined in accordance with the carboxy group amount determination, between before and after the additional oxidation.

Specifically, for example, the cellulose sample in which the amount of carboxy groups has been determined is suspended in 2% by weight aqueous sodium chlorite solution having a pH adjusted to 4-5 with hydrochloric acid and then allowed to stand still therein at ordinary temperature for 48 hours to conduct an additional oxidation treatment, and this cellulose sample which has undergone the additional oxidation treatment is used to determine the amount of carboxy groups again in the manner described above. The amount of carboxy groups determined before the additional oxidation treatment is subtracted from the amount of carboxy groups contained in the cellulose fibers after the additional oxidation treatment, and the resultant difference is taken as the amount of formyl groups (mmol/g). In the cellulose fibers which have undergone an additional oxidation treatment under the same conditions as described above, the formyl groups can be regarded as having been wholly oxidized to carboy groups.

The amount of carboxy groups and the amount of formyl groups in the cellulose fibers, in terms of numerical value per g of the dry cellulose, change through the chemical modification treatment which will be described later, because the treatment results in an increase in mass corresponding to the chemical modification groups that have added to the cellulose. Consequently, it is necessary that the amount of carboxy groups and the amount of formyl groups in the cellulose fibers of the invention should be determined as values for the cellulose fibers which have undergone the substitution with chemical modification groups.
<Chemical Modification Treatment>

The cellulose fibers of the invention are characterized in that part of the hydroxyl groups of the cellulose has been substituted with at least one of a carboxy group and formyl group, the amount of the at least one of a carboxy group and formyl group being 0.1 mmol/g or larger based on the weight of the cellulose fibers, and that the other part of the hydroxyl groups of the cellulose has been substituted with chemical modification group other than carboxy and formyl groups.

It is preferred that the chemical modification groups other than carboxy and formyl groups should be introduced by the chemical modification treatment which will be described later. Although a statement to the effect that it is preferred to introduce the carboxy and/or formyl groups as substituents by the oxidation treatment was given above, these groups may be introduced by the chemical modification treatment which is described below in detail.

The chemical modification treatment may be conducted before the step of giving an oxidation treatment to the raw cellulose fibers or after the step of giving an oxidation treatment to the raw cellulose fibers. It is more preferred that the chemical modification treatment should be conducted after the step of giving an oxidation treatment to the raw cellulose fibers, from the standpoint of avoiding a trouble that the chemical modification groups are eliminated by the oxidation treatment.
(Kinds)

Examples of those chemical modification groups other than carboxy and formyl groups which are introduced into the cellulose by a chemical modification include one or more of acyl groups such as acetyl, acryloyl, methacryloyl, propionyl, propioyl, butyryl, 2-butyryl, pentanoyl, hexanoyl, heptanoyl, octanoyl, nonanoyl, decanoyl, undecanoyl, dodecanoyl, myristoyl, palmitoyl, stearoyl, pivaloyl, benzoyl, naphthoyl, nicotinoyl, isonicotinoyl, furoyl, and cinnamoyl, isocyanate groups such as 2-methacryloyloxyethyl isocyanoyl, alkyl groups such as methyl, ethyl, propyl, 2-propyl, butyl, 2-butyl, tert-butyl, pentyl, hexyl, heptyl, octyl, nonyl, decyl, undecyl, dodecyl, myristyl, palmityl, and stearyl, an oxirane group, an oxetane group, a thiirane group, and a thietane group. Especially preferred of these are an acyl group having 2-12 carbon atoms, such as acetyl, acryloyl, methacryloyl, benzoyl, or naphthoyl, and an alkyl group having 1-12 carbon atoms, such as methyl, ethyl, or propyl.

(Modification Method)

Although methods for the modification are not particularly limited, there is a method in which the raw cellulose fibers are reacted with a chemical modifier such as those shown below. Conditions for this reaction also are not particularly limited. However, a solvent, a catalyst, etc. can be used according to need, and heating, pressure reduction, etc. may be conducted according to need.

With respect to the kind of chemical modifier, examples thereof include one or more members selected from the group consisting of acids, acid anhydrides, alcohols, halogenated reagents, isocyantes, alkoxysilanes, cyclic ethers such as oxiranes (epoxies), and the like.

Examples of the acids include acetic acid, acrylic acid, methacrylic acid, propanoic acid, butanoic acid, 2-butanoic acid, and pentanoic acid.

Examples of the acid anhydrides include acetic anhydride, acrylic anhydride, methacrylic anhydride, propanoic anhydride, butanoic anhydride, 2-butanoic anhydride, and pentanoic anhydride.

Examples of the halogenated reagents include acetyl halides, acryloyl halides, methacryloyl halides, propanoyl halides, butanoyl halides, 2-butanoyl halides, pentanoyl halides, benzoyl halides, and naphthoyl halides.

Examples of the alcohols include methanol, ethanol, propanol, and 2-propanol.

Examples of the isocyanates include methyl isocyanate, ethyl isocyanate, and propyl isocyanate.

Examples of the alkoxysilanes include methoxysilane and ethoxysilane.

Examples of the cyclic ethers such as oxiranes (epoxies) include ethyloxirane and ethyloxetane.

Especially preferred of these is acetic anhydride, acrylic anhydride, methacrylic anhydride, a benzoyl halide, or a naphthoyl halide. One of these chemical modifiers may be used alone, or two or more thereof may be used in combination.

(Degree of Substitution)

The term degree of substitution herein means the number of substituents introduced per unit structure (glucopyranose ring) that constitutes the cellulose. In other words, the degree of substitution is defined as "the value obtained by dividing the number of moles of introduced substituents by the total number of moles of the glucopyranose rings". Since pure cellulose has three replaceable hydroxyl groups per unit structure (glucopyranose ring), a theoretical maximum value of the degree of substitution of the cellulose fibers of the invention is 3 (minimum value thereof is 0).

The degree of substitution with chemical modification groups can be determined through a measurement made by the following titration method. A 0.05-g portion of the dry cellulose is precisely weighed out, and 1.5 mL of ethanol and 0.5 mL of distilled water are added thereto. This mixture is allowed to stand still for 30 minutes in a 60-70° C. water bath, and 2 mL of 0.5-M aqueous sodium hydroxide solution is thereafter added thereto. The resultant mixture is allowed to stand still for 3 hours in a 60-70° C. water bath and then subjected to 30-minute ultrasonic wave propagation with an ultrasonic cleaning device. This mixture is titrated with a 0.2-M standard hydrochloric acid solution using phenolphthalein as an indicator.

Here, the total amount of carboxy groups and chemical modification groups, Q (mol), is determined from the amount of the 0.2-M aqueous hydrochloric acid solution required for the titration, Z (mL), and from the amount of the 0.2-N aqueous hydrochloric acid solution required for titration of a blank sample (i.e., sample containing no dry cellulose), $Z_0$ (mL), using the following equation.

$$Q(\text{mol}) = (Z_0 - Z) \times 0.2 / 1{,}000$$

The mass of the dry cellulose (i.e., the precisely weighed value of 0.05 g; expressed by symbol A) can be considered to be the sum of the mass of unmodified glucopyranose ring structures ($C_6H_{10}O_5$; Mw=162), that of carboxy-substituted glucopyranose structures ($C_6H_8O_6$; Mw=176), and that of glucopyranose structures substituted with one or more chemical modification groups (Mw=145+T; T is the molecular weight of the substituent(s)). When the numbers of moles of the three kinds of structures are expressed by x, y, and z (mol), respectively, the following holds.

$$A(\text{g}) = 162 \times x + 176 \times y + (145 + T) \times z \qquad \text{Equation 1}$$

The value of Q (mol) determined above through titration satisfies the following relationship.

$$Q(\text{mol}) = y + z \qquad \text{Equation 2}$$

Furthermore, the amount of carboxy groups in the cellulose fibers (mmol/g; expressed by symbol B) determined by the method described above in the section (Method for Determining the Amount of Carboxy Groups and Formyl Groups in the Cellulose Fibers) can be converted to y.

$$y(\text{mol}) = [B(\text{mmol/g})] \times [A(\text{g})] / 1{,}000 \qquad \text{Equation 3}$$

While the degree of substitution has been defined as "the value obtained by dividing the number of moles of introduced substituents by the total number of moles of the glucopyranose rings", the degree of substitution with chemical modification groups can be expressed as the following equation.

$$\text{Degree of substitution with chemical modification groups (dimensionless number)} = z / (x + y + z) \qquad \text{Equation 4}$$

Equations 1 to 4 are rearranged with A, B, Q, and T to obtain the following equation 5, with which the degree of substitution with chemical modification groups is determined.

[Math. 1]

$$\text{Degree of substitution with chemical modificiation groups} = \frac{162 \times \{Q - (A \times B / 1000)\}}{A + (T - 31) \times A \times B / 1000 + (17 - T) \times Q} \qquad \text{Equation 5}$$

In the cellulose fibers of the invention, the degree of substitution of the cellulose fibers with chemical modification groups is usually preferably 0.05 or higher, more preferably 0.1 or higher, even more preferably 0.3 or higher, especially preferably 0.5 or higher, and is preferably 2.0 or less, more preferably 1.8 or less, even more preferably 1.5 or less, especially preferably 1.2 or less, most preferably 1.0 or less.

By introducing chemical modification groups other than carboxy and formyl groups through a chemical modification, the cellulose is made to have an elevated decomposition temperature and enhanced heat resistance. However, too high a degree of chemical modification results in destruction of the cellulose structure and in a decrease in crystallinity. There is hence a problem that the cellulose-fiber composite material obtained from such cellulose fibers disadvantageously has an increased coefficient of linear expansion. Thus, too high degrees of chemical modification are undesirable.

<Fibrillation Treatment>

The raw cellulose fibers are subjected to a fibrillation treatment and thereby converted to fibrillated cellulose fibers. Methods for producing the fibrillated cellulose fibers are explained below. As stated above, although there are no particular limitations in the invention on the order in which an oxidation treatment, chemical modification treatment, and fibrillation treatment are given to the raw cellulose fibers described above, it is preferred that a fibrillation treatment should be given to the raw cellulose fibers which have undergone an oxidation treatment and a chemical modification treatment.

Usually, fibrillated cellulose fibers are obtained in the state of a dispersion which contains the fibrillated cellulose fibers dispersed therein. In this case, the term fibrillated cellulose fibers means fibrillated cellulose fibers which include a dispersion that contains the fibrillated cellulose fibers dispersed therein.

The fibrillated cellulose fibers can be used to produce a cellulose fiber assembly, and the mass can be used to obtain the cellulose-fiber composite material which will be described later. The cellulose-fiber composite material is less apt to take a color and is suitable for use as, for example, substrates for electrical/electronic devices such as flat displays, OLED illuminators, or solar cells.

Specific methods for the fibrillation treatment are not particularly limited. Examples thereof include: a method in which ceramic beads having a diameter of about 1 mm are added to a dispersion of the raw cellulose fibers which has a raw-cellulose-fiber concentration of preferably 0.1-10% by weight, e.g., about 1% by weight (hereinafter often referred to as "cellulose fiber dispersion") and this mixture is oscillated using a paint shaker, bead mill, or the like to fibrillate the cellulose; a method in which a cellulose fiber dispersion is passed through a blender type disperser or through the slit between members rotating at a high speed, thereby applying shear force to the fibers to fibrillate the fibers (method in which a high-speed rotation type homogenizer is used); a method in which an abrupt pressure drop from a high pressure is caused and shear force is thereby generated between the cellulose fibers to fibrillate the fibers (method in which a high-pressure homogenizer method is used); and a method in which a countercurrent collision type disperser, such as "Masscomizer X (Masuko Sangyo)", or the like is used. In particular, the efficiency of fibrillation is improved by employing a treatment with a high-speed rotation type homogenizer or a high-pressure homogenizer.

As the dispersion medium of the cellulose fiber dispersion, use can be made, for example, of an organic solvent, water, and a liquid mixture of an organic solvent and water. As the organic solvent, use can be made, for example, of one or more members selected from alcohols such as methanol, ethanol, isopropyl alcohol, n-propyl alcohol, n-butanol, ethylene glycol, and ethylene glycol mono-t-butyl ether, ketones such as acetone and methyl ethyl ketone, and other water-soluble organic solvents. It is preferred that the dispersion medium should be either a liquid mixture of an organic solvent and water or water. It is especially preferred that the dispersion medium should be water.

In the case where the raw cellulose fibers are fibrillated through any of those treatments, the fibrillation treatment is given to a cellulose fiber dispersion having a solid concentration, in terms of the concentration of the raw cellulose fibers, which is preferably 0.1% by weight or higher, more preferably 0.2% by weight or higher, especially preferably 0.3% by weight or higher, and is preferably 10% by weight or less, more preferably 6% by weight or less.

In case where the cellulose fiber dispersion to be subjected to the fibrillation treatment has too low a solid concentration, the amount of the liquid relative to the amount of the raw cellulose fibers to be treated is too large, resulting in poor efficiency. In case where the dispersion has too high a solid concentration, this dispersion has impaired flowability. It is therefore preferred that the concentration of the cellulose fiber dispersion to be subjected to the fibrillation treatment should be regulated, for example, by suitably adding water thereto.

Incidentally, after such a treatment with a high-pressure homogenizer or high-speed rotation type homogenizer, a microfining treatment based on a combination with an ultrasonic treatment may be performed.

(Average Fiber Diameter of the Fibrillated Raw Cellulose Fibers)

The diameter of the cellulose fibers (fibrillated cellulose fibers) in the cellulose fiber dispersion which has undergone fibrillation by the method described above and which may have further undergone microfining can be determined by drying the dispersion to remove the dispersion medium (forming a sheet) and then examining the sheet with an SEM, TEM, or the like to measure the diameters of the fibers.

The number-average fiber diameter of the fibrillated cellulose fibers is preferably 400 nm or less, more preferably 100 nm or less, even more preferably 80 nm or less, especially preferably 50 nm or less, from the standpoint of obtaining a highly transparent cellulose-fiber composite material.

The smaller the number-average fiber diameter, the more the cellulose fibers are preferred. It is, however, important to maintain the crystallinity of the cellulose for enabling the cellulose fibers to bring about a low coefficient of linear expansion and a high modulus of elasticity. Practically, the number-average fiber diameter thereof is at least 2 nm, which is the fiber diameter corresponding to the cellulose crystal unit, and preferably is 4 nm or larger.

2. Processes for Producing the Cellulose Fiber Assembly

Next, processes for producing the cellulose fiber assembly of the invention using the cellulose fibers of the invention are explained.

<Production of the Mass>

The cellulose fiber assembly includes the cellulose fibers of the invention and is usually produced using fibrillated cellulose fibers which have been microfined by a fibrillation treatment. The term cellulose fiber assembly as used in the invention means a mass of cellulose fibers which is usually obtained by removing the dispersion medium from the fibrillated cellulose fibers in a dispersion form by a method such as, for example, filtering the dispersion or volatilizing the dispersion medium from the dispersion applied to an appropriate substrate. Examples of the cellulose fiber assembly include a sheet, particles, and a gel.

In this connection, when the cellulose fiber assembly is produced, use may be made of a method in which, as shown in Example II-1 to be given later, a fibrillated-cellulose-fiber dispersion obtained by fibrillation is centrifuged to obtain a supernatant which contains ultrafine cellulose fibers only and this supernatant is used to produce a cellulose fiber assembly. From the cellulose fiber assembly thus obtained, a cellulose-fiber composite material having remarkably high transparency can be obtained.

(Sheet)

The fibrillated cellulose fibers obtained can be used to obtain a cellulose fiber sheet. The formation of a cellulose fiber sheet makes it possible to produce a cellulose-fiber composite material by impregnating the sheet with a resin or to produce a cellulose-fiber composite material by sandwiching the cellulose fiber sheet between resin sheets.

Cellulose fiber sheets produced from fibrillated cellulose fibers which have undergone a fibrillation treatment are more suitable for use in producing cellulose-fiber composite materials having high transparency, a low coefficient of linear expansion, and a high modulus of elasticity. The cellulose fiber sheet specifically is a sheet produced, for example, by filtering the fibrillated cellulose fibers in a dispersion form which have undergone the fibrillation treatment described above or by applying the dispersion to an appropriate substrate.

In the case where a cellulose fiber sheet is produced by filtering the fibrillated cellulose fibers in a dispersion form, the cellulose fiber concentration of the dispersion to be subjected to filtration is preferably 0.01% by weight or higher, more preferably 0.05% by weight or higher, even more preferably 0.1% by weight or higher. In case where the cellulose fiber concentration of the dispersion is too low, the filtration requires much time and is inefficient.

Meanwhile, the cellulose fiber concentration of the dispersion is preferably 1.5% by weight or less, more preferably 1.2% by weight or less, even more preferably 1.0% by weight or less. When the cellulose fiber concentration of the dispersion is too high, there are cases where an even sheet is not obtained therefrom.

In the case where the dispersion is filtered, it is important for the filter cloth for the filtration to prevent the microfined cellulose fibers from passing therethrough and not to render the filtration rate too low. Preferred as such a filter cloth is a sheet, woven fabric, or porous film which is constituted of an organic polymer.

Preferred as the organic polymer is a non-cellulose organic polymer such as, for example, poly(ethylene terephthalate), polyethylene, polypropylene, or polytetrafluoroethylene (PTFE).

Specific examples thereof include a porous film of polytetrafluoroethylene having a pore diameter of 0.1-20 μm, e.g., 0.5-1 μm, or woven fabric of poly(ethylene terephthalate) or polyethylene having a pore diameter of 0.1-20 μm, e.g., 0.5-1 μm.

The cellulose fiber sheet can have any of various porosities depending on the process for production thereof. In the case where the cellulose fiber sheet is impregnated with a resin to obtain a cellulose-fiber composite material, it is preferred that this cellulose fiber sheet should have some degree of porosity because the cellulose fiber sheet having a low porosity is difficult to impregnate with the resin. The porosity thereof in this case is usually preferably 10% by volume or higher, more preferably 20% by volume or higher.

It should, however, be noted that when the cellulose fiber sheet has too high porosity, there are cases where the cellulose fibers do not produce a sufficient reinforcing effect when this cellulose fiber sheet is used to obtain a cellulose-fiber composite material, resulting in an insufficiently low coefficient of linear expansion or an insufficient modulus of elasticity. It is therefore preferred that the porosity of the sheet should be 80% by volume or less.

The porosity of the cellulose fiber sheet herein is determined using the following equation as a simplified method.

$$\text{Porosity(vol \%)} = \{1 - B/(M \times A \times t)\} \times 100$$

In the equation, symbol A is the area of the cellulose fiber sheet ($cm^2$), t is the film thickness (cm), B is the weight of the sheet (g), and M is the density of the cellulose; in the invention, M is regarded as 1.5 $g/cm^3$.

The thickness of the cellulose fiber sheet is determined by using a film thickness meter (PDN-20, manufactured by PEACOK) to make measurements with respect to 10 points at various sites in the sheet and averaging the measured values. In the section Examples which will be given later, film thicknesses were determined by this measuring method.

Examples of methods for obtaining a cellulose fiber sheet having a high porosity include a method in which in the step of film formation by filtration, the water remaining in the cellulose fiber sheet is finally displaced by an organic solvent, e.g., an alcohol.

In this method, an organic solvent such as, for example, an alcohol is added at the time when filtration for water removal is performed and the resultant sheet has come to have a cellulose content of 5-99% by weight. Alternatively, a method in which a dispersion of fibrillated cellulose fibers is introduced into a filtration apparatus and an organic solvent, e.g., an alcohol, is thereafter gently placed over the dispersion can also be used to finally displace the water remaining in the cellulose fiber sheet by the organic solvent, e.g., alcohol.

The organic solvent, e.g., alcohol, to be used here is not particularly limited. Examples thereof include one or more organic solvents selected from alcohols such as methanol, ethanol, 1-propanol, 2-propanol, 1-butanol, ethylene glycol, and ethylene glycol mono-t-butyl ether, acetone, methyl ethyl ketone, tetrahydrofuran, cyclohexane, toluene, carbon tetrachloride, and the like. In the case of using a water-insoluble organic solvent, it is preferred that this solvent should be used as a mixture with a water-soluble organic solvent or that displacement by a water-soluble organic solvent should be followed by displacement by the water-insoluble organic solvent.

By thus regulating the porosity, the thickness of the cellulose fiber sheet can also be regulated.

Other examples of methods for regulating porosity include a method in which a solvent having a higher boiling point than those alcohols is mixed with the dispersion of fibrillated cellulose fibers and the mixture is dried at a temperature lower than the boiling point of this solvent.

In this case, use may be made of a method in which the high-boiling solvent remaining after the drying is optionally displaced by another solvent and the resultant cellulose fiber sheet is thereafter impregnated with a resin to obtain a cellulose-fiber composite material. Although the cellulose fiber sheet which has undergone solvent removal by filtration is dried thereafter, the drying may be omitted if desired and the undried sheet may be subjected to the next step.

Namely, in the case where the fibrillated cellulose fibers in a dispersion form which have undergone a heat treatment are filtered and then impregnated with a resin, the cellulose fiber sheet obtained by the filtration can be directly subjected to resin impregnation without via a drying step.

Also in the case where the fibrillated cellulose fibers in the form of a cellulose fiber dispersion are filtered and the resultant sheet is subjected to a heat treatment, the sheet can be subjected to the heat treatment without via a drying step.

It is, however, preferred to conduct the drying described above, from the standpoints of regulating the porosity and film thickness and further reinforcing the structure of the sheet.

The drying may be either drying by air blowing, or vacuum drying, or pressure drying. The drying may be conducted with heating. In the case where heating is conducted, the temperature is preferably 50° C. or higher, more preferably 80° C. or higher, and is preferably 250° C. or lower, more preferably 150° C. or lower.

In case where the heating temperature is too low, there is a possibility that the drying might require much time or the drying might be insufficient. In case where the heating temperature is too high, there is a possibility that the cellulose fiber sheet might take a color or the cellulose might decompose.

When pressing is conducted, the pressure is preferably 0.01 MPa or higher, more preferably 0.1 MPa or higher, and is preferably 5 MPa or less, more preferably 1 MPa or less. In case where the pressure is too low, there is a possibility that the drying might be insufficient. In case where the pressure is too high, there is a possibility that the cellulose fiber sheet might be flattened or the cellulose might decompose.

There are no particular limitations on the thickness of the cellulose fiber sheet. However, the thickness thereof is preferably 1 µm or larger, more preferably 5 µm or larger, and is usually preferably 1,000 µm or less, more preferably 250 µm or less.

(Particles)

The fibrillated cellulose fibers can be used to obtain cellulose fiber particles. The cellulose fiber particles are suitable for use in compositing by kneading especially with a thermoplastic resin. The resultant composite materials are useful, for example, as various structural materials, in particular, automotive panels having an attractive surface appearance or external-wall panels for buildings, while taking advantage of the properties thereof such as a high modulus of elasticity, a low coefficient of linear expansion, and surface smoothness.

Examples of methods for forming the fibrillated cellulose fibers into particles include a method in which the fibrillated cellulose fibers in a dispersion form are ejected from a spray nozzle or the like using, for example, a known spray dryer to thereby remove the dispersion medium and form particles.

Specific examples of methods for the ejection include a method in which a rotating disk is used, a method in which a pressure nozzle is used, and a method in which a two-fluid nozzle is used. Particles obtained by spray drying may be further dried using another dryer. Examples of heat energy sources in this case include infrared rays and microwaves.

Furthermore, cellulose fiber particles can be obtained also by freeze-drying and then pulverizing the fibrillated cellulose fibers. Examples of methods for this procedure include a method in which the fibrillated cellulose fibers are cooled with, for example, liquid nitrogen and then pulverized with a grinder, a rotating blade, or the like.

There are no particular limitations on the diameter of the cellulose fiber particles. However, the diameter thereof is usually preferably 1 µm to 1 mm, more preferably 5-100 µm, even more preferably 5-50 µm. In case where the diameter of the cellulose fiber particles is too large, a dispersion failure may occur when the particles are composited with a resin. In case where the diameter thereof is too small, these particles are apt to be blown up lightly and are difficult to handle.

(Gel)

The fibrillated cellulose fibers can be composited with a polymer other than cellulose to obtain a cellulose-fiber composite material. This compositing with a polymer other than cellulose may be conducted in the dispersion medium without removing the dispersion medium from the fibrillated cellulose fibers, and a composite material can be obtained by removing the dispersion medium after the compositing.

It is more preferred that the dispersion medium for the fibrillated cellulose fibers should be displaced by a dispersion medium of a kind suitable for compositing with a polymer other than cellulose, prior to the compositing. For example, the dispersion medium is changed from water to an organic solvent, or changed from an organic solvent to water.

There are cases where during the removal or displacement of the dispersion medium in the composting of the fibrillated cellulose fibers, the fibrillated cellulose fibers come into a cellulose fiber gel state.

The cellulose fiber gel is a material in which the cellulose fibers constitute a three-dimensional network structure and this structure is in the state of having been wetted or swollen by the dispersion medium. The network structure is formed by chemical crosslinking or physical crosslinking. The three-dimensional network structure of the cellulose fibers in the gel is maintained by the presence of the dispersion medium which is contained in a given amount in the gel.

The content of the dispersion medium in the gel is preferably 10% by weight or higher, more preferably 50% by weight or higher, even more preferably 70% by weight or higher. By regulating the content thereof so as to be within that range, a cellulose-fiber composite material having sufficient optical isotropy and surface smoothness is obtained.

The upper limit thereof is preferably 99% by weight or less, more preferably 97% by weight or less, even more preferably 95% by weight or less. By regulating the content thereof so as to be within that range, the gel can be made to have enhanced handleability and improved productivity.

The content of the cellulose fibers in the gel is usually preferably 90% by weight or less, more preferably 50% by weight or less, even more preferably 30% by weight or less. By regulating the content thereof so as to be within that range, a cellulose-fiber composite material having sufficient optical isotropy and surface smoothness is obtained.

The lower limit thereof is preferably 1% by weight or higher, more preferably 3% by weight or higher, even more preferably 5% by weight or higher. By regulating the content thereof so as to be within that range, the gel can be made to have enhanced handleability and improved productivity.

The weight ratio between the dispersion medium and the cellulose fibers (cellulose fibers/dispersion medium) in the gel is preferably from 9/1 to 1/99, more preferably from 1/1 to 3/97, even more preferably from 3/7 to 5/95. By regulating the weight ratio to 9/1 or less, a cellulose-fiber composite material having sufficient optical isotropy and surface smoothness is obtained. By regulating the weight ratio to 1/99 or higher, the cellulose fiber gel can be made to retain the shape thereof and be rendered easy to handle.

The dispersion medium contained in the cellulose fiber gel usually is the dispersion medium for the fibrillated cellulose fibers and generally is water. However, the dispersion medium may be one organic solvent or a mixed dispersion medium composed of two or more organic solvents. The dispersion medium may be a mixed dispersion medium composed of water and an organic solvent.

The dispersion medium contained in the cellulose fiber gel can be displaced by another kind of dispersion medium according to need, so long as the dispersion medium content is within the range shown above. Namely, after the gel production step, a dispersion-medium displacement step may be optionally conducted in which the dispersion medium (first dispersion medium) in the cellulose fiber gel is displaced by another dispersion medium (second dispersion medium).

Examples of methods for the displacement include a method in which the dispersion medium contained in a given amount in the dispersion is removed by the filtration method described above and an organic solvent, e.g., an alcohol, is added to the residue to thereby produce a gel which contains the organic solvent, e.g., alcohol. More specific examples include the case where the first dispersion medium is water and the second dispersion medium is an organic solvent.

The kind of the second dispersion medium is not particularly limited. Examples thereof include one or more organic solvents selected from alcohols such as methanol, ethanol, 1-propanol, 2-propanol, and 1-butanol, acetone, methyl ethyl ketone, tetrahydrofuran, cyclohexane, toluene, carbon tetrachloride, and the like.

The shape of the cellulose fiber gel is not particularly limited, and the gel can be suitably regulated so as to have a sheet or film shape (having a thickness of, for example, 10 µm to 10 cm), a particulate shape, etc.

3. Cellulose-Fiber Composite Material

The cellulose-fiber composite material of the invention includes the cellulose fibers of the invention and a matrix material. Usually, the cellulose-fiber composite material of the invention is obtained by compositing the cellulose fiber assembly described above, e.g., a cellulose fiber sheet, cellulose fiber particles, or a cellulose fiber gel, with a matrix material. It is also possible to produce a cellulose-fiber composite material directly from the fibrillated cellulose fibers without via the cellulose fiber assembly.

The cellulose-fiber composite material of the invention is useful, for example, as materials for various display substrates, substrates for solar cells, or window materials, while taking advantage of the properties thereof such as high transparency, a low coefficient of linear expansion, and non-discoloring properties. Furthermore, the composite material is useful, for example, as various structural materials, in particular, automotive panels having an attractive surface appearance or external-wall panels for buildings, while taking advantage of the properties thereof such as a high modulus of elasticity, a low coefficient of linear expansion, and surface smoothness.

Processes for producing the cellulose-fiber composite material by compositing either the cellulose fiber assembly or the fibrillated cellulose fibers are explained below.

The cellulose-fiber composite material is a composite material obtained by compositing either a cellulose fiber assembly obtained by the method described above, such as a cellulose fiber sheet, cellulose fiber particles, or a cellulose fiber gel, or the fibrillated cellulose fibers with a polymeric material (matrix material) other than cellulose.

The term matrix material herein means a polymeric material or precursor therefor (e.g., a monomer) which is used for laminating with a cellulose fiber sheet, filling interstices, or kneading cellulose fiber particles obtained by particle formation.

A suitable example of the matrix material is at least one resin (polymeric material) or precursor therefor obtained from a thermoplastic resin which becomes a flowable liquid upon heating, a thermosetting resin which polymerizes upon heating, a resin curable with actinic energy rays which polymerizes and cures upon irradiation with actinic energy rays such as ultraviolet rays or electron beams, etc.

In the invention, the term "precursor for a polymeric material" means one or more monomers or oligomers. Examples thereof include the monomers and the like (hereinafter sometimes referred to as "thermoplastic-resin precursors") shown later as polymer or copolymer components in the section Thermoplastic Resin and the precursors shown later in the section Thermosetting Resin and the section Photocurable Resin.

Examples of methods for compositing a matrix material with a cellulose fiber sheet, cellulose fiber particles, or a cellulose fiber gel or with fibrillated cellulose fibers include the following methods (a) to (j). The step of polymerizing and curing a curable resin will be described in the section <Polymerization/Curing Step>.

(a) A method in which a liquid thermoplastic-resin precursor is infiltrated into the cellulose fiber sheet, cellulose fiber particles, or cellulose fiber gel and then polymerized.

(b) A method in which a thermosetting-resin precursor or a photocurable-resin precursor is infiltrated into the cellulose fiber sheet, cellulose fiber particles, or cellulose fiber gel and then polymerized and cured.

(c) A method in which a resin solution (a solution containing one or more solutes selected from thermoplastic resins, thermoplastic-resin precursors, thermosetting-resin precursors, and photocurable-resin precursors) is infiltrated into the cellulose fiber sheet, cellulose fiber particles, or cellulose fiber gel and dried, and the components are thereafter brought into close contact with each other with a hot press or the like, the matrix material being polymerized and cured according to need.

(d) A method in which a melt of a thermoplastic resin is infiltrated into the cellulose fiber sheet, cellulose fiber particles, or cellulose fiber gel, and the components are brought into close contact with each other with a hot press or the like.

(e) A method in which a thermoplastic-resin sheet and either the cellulose fiber sheet or the cellulose fiber gel are disposed alternately and brought into close contact with each other with a hot press or the like.

(f) A method in which a liquid thermoplastic-resin precursor, thermosetting-resin precursor, or photocurable-resin precursor is applied to one or both surfaces of the cellulose fiber sheet or cellulose fiber gel and then polymerized and cured.

(g) A method in which a resin solution (a solution containing one or more solutes selected from thermoplastic resins, thermoplastic-resin precursors, thermosetting-resin precursors, and photocurable-resin precursors) is applied to one or both surfaces of the cellulose fiber sheet or cellulose fiber gel, and the solvent is removed, the matrix material being thereafter polymerized and cured according to need.

(h) A method in which the cellulose fiber particles and a thermoplastic resin are melt-kneaded, and the resultant mixture is formed into a sheet or a desired shape.

(i) A method in which the fibrillated cellulose fibers are mixed with a monomer solution or dispersion (a solution or dispersion containing one or more solutes or dispersoids selected from thermoplastic-resin precursors, thermosetting-resin precursors, and photocurable-resin precursors), and the resultant mixture is subjected to solvent removal and polymerization/curing.

(j) A method in which the fibrillated cellulose fibers are mixed with a polymer solution or dispersion (a thermoplastic-resin solution or dispersion), and the solvent is removed thereafter.

Of those methods, method (a), (b), (c), (d), (e), (f), or (g) is preferred for the cellulose fiber sheet, and method (h) is preferred for the cellulose fiber particles.

<Matrix Material>

Examples of the matrix material other than cellulose which is to be composited with a cellulose fiber sheet, cellulose fiber particles, a cellulose fiber gel, or fibrillated cellulose fibers in the invention are shown below. However, the matrix material to be used in the invention should not be construed as being limited to the following examples. In the invention, two or more of thermoplastic resins, thermosetting resins, and photocurable resins (resins curable with actinic energy rays) can be used as a mixture thereof.

In the invention, preferred of the following matrix materials (polymeric materials or precursors therefor) are polymeric materials which are amorphous synthetic polymers having a high glass transition temperature (Tg) or precursors that give polymers which are such synthetic polymers, from the standpoint of obtaining a cellulose-fiber composite material having excellent transparency and high durability.

With respect to the degree of amorphousness of the synthetic polymers, the degree of crystallinity thereof is preferably 10% or less, especially preferably 5% or less. The Tg of the synthetic polymers is preferably 110° C. or higher, more preferably 120° C. or higher, especially preferably 130° C. or higher.

When the Tg of the synthetic polymers is in that range, there is a possibility that the cellulose-fiber composite material might deform upon contact with hot water or the like to pose a problem in practical use. From the standpoint of obtaining a cellulose-fiber composite material having low water absorption properties, it is preferred to select a polymeric material in which the content of hydrophilic functional groups, such as hydroxyl, carboxy, or amino groups, is low.

Incidentally, the Tg of a polymeric material can be determined by a general method. For example, the Tg thereof can be determined through a measurement made by the DSC method. The degree of crystallinity of a polymer can be calculated from the density of the amorphous portions and that of the crystalline portions. It is also possible to calculate the degree of crystallinity thereof through a dynamic viscoelasticity measurement from tan δ, which is the ratio of the modulus of elasticity and the coefficient of viscosity.

(Thermoplastic Resin)

The thermoplastic resin is not particularly limited. Examples thereof include styrene resins, acrylic resins, aromatic polycarbonate resins, aliphatic polycarbonate resins, aromatic polyester resins, aliphatic polyester resins, aliphatic polyolefin resins, cycloolefin resins, polyamide resins, poly(phenylene ether) resins, thermoplastic polyimide resins, polyacetal resins, polysulfone resins, and amorphous fluororesins.

(Thermosetting Resin)

The thermosetting resin is not particularly limited. Examples thereof include precursors of epoxy resins, acrylic resins, oxetane resins, phenolic resins, urea resins, melamine resins, unsaturated polyester resins, silicone resins, polyurethane resins, and diallyl phthalate resins.

(Photocurable Resin)

The photocurable resin is not particularly limited. Examples thereof include some of the precursors shown above as examples of the thermosetting resin, i.e., precursors of epoxy resins, acrylic resins, oxetane resins, etc.

Specific examples of the thermoplastic resin, thermosetting resin, and photocurable resin include those shown in JP-A-2009-299043.

(Other Ingredients)

The thermoplastic resin, thermosetting resin, and photocurable resin are suitably used as a composition (hereinafter referred to as curable composition) obtained by mixing the resin with a chain transfer agent, ultraviolet absorber, filler, silane coupling agent, etc.

<Chain Transfer Agent>

The curable composition may contain a chain transfer agent, for example, for the purpose of causing the reaction to proceed evenly. As the chain transfer agent, use can be made, for example, of one or more polyfunctional mercaptan compounds having two or more thiol groups in the molecule. Use of these compounds can impart moderate toughness to the cured object.

As the mercaptan compound(s), it is preferred to use one or more compounds selected from pentaerythritol tetrakis(β-thiopropionate), trimethylolpropane tris(β-thiopropionate), tris[2-(β-thiopropionyloxyethoxy)ethyl]triisocyanurate, and the like.

In the case where a mercaptan compound is incorporated into the curable composition, it is preferred to incorporate the chain transfer agent usually in a proportion of 30% by weight or less based on the sum of the radical-polymerizable compounds contained in the curable composition.

<Ultraviolet Absorber>

The curable composition may contain an ultraviolet absorber for the purpose of coloring prevention. For example, the ultraviolet absorber is selected from benzophenone-based ultraviolet absorbers and benzotriazole-based ultraviolet absorbers. One of such ultraviolet absorbers may be used, or two or more thereof may be used in combination.

In the case where an ultraviolet absorber is incorporated into the curable composition, it is preferred to incorporate the ultraviolet absorber usually in a proportion of 0.01-1 part by weight per 100 parts by weight of the sum of the radical-polymerizable compounds contained in the curable composition.

<Filler Other than Cellulose>

The curable composition may contain a filler other than cellulose fibers. Examples of the filler include inorganic particles and organic polymers. Specific examples thereof include inorganic particles such as silica particles, titania particles, and alumina particles, transparent cycloolefin polymers such as Zeonex (Nippon Zeon Co., Ltd.) and Arton (JSR Co., Ltd.), and general-purpose thermoplastic polymers such as polycarbonates and poly(methyl methacrylate).

Use of nanometer-size silica particles, among those fillers, is suitable because the transparency can be maintained. Furthermore, use of a polymer which is akin in structure to the ultraviolet-curable monomer is preferred because this polymer can be dissolved to a high concentration.

<Silane Coupling Agent>

A silane coupling agent may be added to the curable composition. Examples of the silane coupling agent include γ-((meth)acryloxypropyl)trimethoxysilane, γ-((meth)acryloxypropyl)methyldimethoxysilane, γ-((meth)acryloxypropyl)methyldiethoxysilane, γ-((meth)acryloxypropyl)triethoxysilane, and γ-(acryloxypropyl)trimethoxysilane. These silane coupling agents are preferred because these compounds have a (meth)acryl group in the molecule and are copolymerizable with other monomers.

In the case where a silane coupling agent is incorporated into the curable composition, the amount of the silane coupling agent to be incorporated is usually preferably 0.1-50% by weight, more preferably 1-20% by weight, based on the sum of the radical-polymerizable compounds contained in the curable composition. By incorporating a silane coupling agent in an amount not less than the lower limit, the effect of incorporation thereof is produced sufficiently. By regulating the amount thereof so as to be not larger than the upper limit, the optical properties of the cured object, including transparency, can be prevented from being impaired.

<Polymerization/Curing Step>

The curable composition for forming the cellulose-fiber composite material of the invention can be polymerized and cured by a known method. Examples of the curing method include thermal curing and radiation curing. Radiation curing is preferred.

Examples of the radiation include infrared rays, visible light, ultraviolet rays, and electron beams. However, light is preferred. More preferred is light having a wavelength of about 200-450 nm. Even more preferred are ultraviolet rays having a wavelength of 250-400 nm.

Specific examples include: a method in which a heat-polymerization initiator that generates a radical upon heating is added to the curable composition beforehand and the composition is polymerized by heating (hereinafter sometimes referred to as "heat polymerization"); a method in which a photopolymerization initiator that generates a radical by the action of radiation, e.g., ultraviolet rays, is added to the curable composition beforehand and the composition is polymerized by irradiation with the radiation (hereinafter sometimes referred to as "photopolymerization"); and a method in which a heat-polymerization initiator and a photopolymerization initiator are added in combination to the curable composition beforehand and the composition is polymerized by means of a combination of heat and light. In the invention, photopolymerization is more preferred.

As the photopolymerization initiator, a photo-radical generator is usually used. As the photo-radical generator, use can be made of a known compound which is known to be usable in this application. Examples thereof include benzophenone, benzoin methyl ether, benzoin propyl ether, diethoxyacetophenone, 1-hydroxycyclohexyl phenyl ketone, 2,6-dimethylbenzoyldiphenylphosphine oxide, and 2,4,6-trimethylbenzoyldiphenylphosphine oxide. Preferred of these is 2,4,6-trimethylbenzoyldiphenylphosphine oxide. These photopolymerization initiators may be used alone or in combination of two or more thereof.

The amount of the photopolymerization initiator ingredient is preferably 0.001 part by weight or larger, more preferably 0.05 parts by weight or larger, even more preferably 0.01 part by weight or larger, per 100 parts by weight of the sum of the radical-polymerizable compounds contained in the curable composition. The upper limit thereof is usually preferably 1 part by weight or less, more preferably 0.5 parts by weight or less, even more preferably 0.1 part by weight or less.

By regulating the addition amount of a photopolymerization initiator so as to be not larger than the upper limit, the polymerization can be inhibited from proceeding too rapidly and the cured object to be obtained can be prevented from having enhanced birefringence and made to have an improved hue.

For example, in case where the initiator is used in an amount of 5 parts by weight, the light cannot reach the side opposite to the ultraviolet irradiation side due to the absorption by the initiator, resulting in an uncured portion. In addition, this composition yellows, resulting in a considerable deterioration in hue. Meanwhile, by regulating the amount thereof so as to be not less than the lower limit, the polymerization can be caused to proceed sufficiently by ultraviolet irradiation.

The curable composition may contain a heat-polymerization initiator in combination with the photopolymerization initiator. Examples thereof include hydroperoxides, dialkyl peroxides, peroxyesters, diacyl peroxides, peroxycarbonates, peroxyketals, and ketone peroxides.

Specific examples thereof include benzoyl peroxide, diisopropyl peroxycarbonate, t-butyl peroxy(2-ethylhexanoate), dicumyl peroxide, di-t-butyl peroxide, t-butyl peroxybenozate, t-butyl hydroperoxide, diisopropylbenzene hydroperoxide, and 1,1,3,3-tetramethylbutyl hydroperoxide.

In case where heat polymerization is initiated during light irradiation, the polymerization becomes difficult to control. Consequently, preferred of those are heat-polymerization initiators having a 1-minute half-life temperature of 120° C. or higher. Those heat-polymerization initiators may be used alone or in combination of two or more thereof.

The amount of radiation to be irradiated for curing is not limited so long as the photopolymerization initiator generates a radical. However, in case where the amount thereof is exceedingly small, the polymerization is not completed and, hence, the cured object is insufficient in heat resistance and mechanical property. Conversely, in case where the amount thereof is exceedingly too large, the cured object suffers a deterioration due to light, e.g., yellowing. Consequently, ultraviolet rays having a wavelength of preferably 300-450 nm are irradiated in an amount more preferably in the range of 0.1-200 $J/cm^2$, even more preferably in the range of 1-20 $J/cm^2$, according to the composition of the monomers and the kind and amount of the photopolymerization initiator.

It is more preferred that the irradiation of radiation should be conducted in installments. Specifically, for example, when radiation is irradiated in the first irradiation in an amount of about 1/20 to 1/3 the overall radiation amount and is irradiated in the second and any succeeding irradiation in the necessary remaining amount, then a cured object having lower birefringence is obtained. Examples of the lamp to be used include metal halide lamps, high-pressure mercury lamps, ultraviolet LED lamps, and electrodeless mercury lamps.

For the purpose of completing the polymerization without delay, photopolymerization and heat polymerization may be simultaneously conducted. In this case, the curable composition is heated at a temperature preferably in the range of 30-300° C., simultaneously with irradiation with radiation, to thereby cure the composition. Although a heat-polymerization initiator may be added in this case to the curable composition in order to complete the polymerization, addition thereof in a large amount results in an increase in the birefringence of the cured object and a deterioration in the hue thereof. Consequently, the amount of the heat-polymerization initiator to be used is usually preferably 0.1-2% by weight, more preferably 0.3-1% by weight, based on the sum of the radical-polymerizable compounds contained in the curable composition.

<Multilayer Structure>

The cellulose-fiber composite material obtained according to the invention may be a multilayer structure configured of one or more layers of the cellulose fiber sheet obtained according to the invention and one or more plane structure layers constituted of the polymer other than cellulose which was described above, or may be a multilayer structure configured of one or more layers of the cellulose fiber sheet obtained according to the invention and one or more layers of a cellulose-fiber composite material obtained according to the invention. There are no particular limitations on the number of the layers or on the layer configuration.

It is also possible to obtain a laminate by superposing a plurality of layers which each are a sheet- or plate-form cellulose-fiber composite material obtained according to the invention. In this case, composites containing cellulose fibers may be laminated with a resin sheet containing no cellulose fibers.

In this case, for the purpose of bonding layers of the cellulose-fiber composite material to each other or bonding a resin sheet to a layer of the cellulose-fiber composite material, an adhesive may be applied or an adhesive sheet may be interposed. It is also possible to subject the stack to hot pressing to unite the layers together.

<Inorganic Film>

The cellulose-fiber composite material to be obtained according to the invention may be a composite material in which an inorganic film has been further superposed on a cellulose-fiber composite material layer, or may be a composite material in which an inorganic film has been further superposed on the multilayer structure described above, according to uses thereof.

The inorganic film to be used here is suitably determined according to uses of the cellulose-fiber composite material. Examples thereof include metals such as platinum, silver, aluminum, gold, and copper, silicon, ITO, $SiO_2$, SiN, SiOxNy, ZnO, and TFT. A combination of two or more thereof and a film thickness can be designed at will.

<Properties of the Cellulose-Fiber Composite Material>

Suitable properties of the cellulose-fiber composite material obtained according to the invention are explained below.

(Cellulose Content)

It is preferred that the content of cellulose (content of cellulose fibers) in the cellulose-fiber composite material of the invention should be usually 1-99% by weight and the content therein of the matrix material other than cellulose should be 1-99% by weight.

From the standpoint that the composite material has a low coefficient of linear expansion, it is preferred that the content of cellulose should be 1% by weight or higher and the content of the matrix material other than cellulose should be 99% by weight or less. From the standpoint that the composite material has transparency, it is preferred that the content of cellulose should be 99% by weight or less and the content of the matrix material other than cellulose should be 1% by weight or higher.

More preferred ranges are 5-90% by weight for cellulose and 10-95% by weight for the matrix material other than cellulose. Even more preferred ranges are 10-80% by weight for cellulose and 20-90% by weight for the matrix material other than cellulose. It is especially preferred that the content of cellulose should be 30-70% by weight and the content of the matrix material other than cellulose should be 30-70% by weight.

The content of cellulose and that of the matrix material other than cellulose in the cellulose-fiber composite material can be determined, for example, from the weight of the cellulose fibers which have not been composited and the weight of the cellulose-fiber composite material obtained through compositing.

It is also possible to use a method in which the cellulose-fiber composite material is immersed in a solvent in which the matrix material is soluble, thereby extracting the matrix material only, and the cellulose content and the matrix material content are determined from the weight of the remaining cellulose fibers. Other usable methods include a method in which the contents are determined from the specific gravity of the resin used as the matrix material and a method in which the contents are determined by determining the amount of the functional groups of either the resin or the cellulose by means of NMR or IR spectroscopy.

(Thickness)

The cellulose-fiber composite material obtained according to the invention has a thickness of preferably 10 μm to 10 cm. By regulating the thickness thereof so as to be within such range, the composite material can be made to retain strength required of structural materials. The thickness of the cellulose-fiber composite material is more preferably 50 μm to 1 cm, even more preferably 80-250 μm.

Although the cellulose-fiber composite material obtained according to the invention is, for example, in a film or plate form having such a thickness, the shape thereof is not limited to flat films or flat plates. The composite material can be in a film or plate form having a curved surface, and may have any other unusual shape. The thickness thereof need not be always even, and may differ partly.

(Coloring)

The cellulose-fiber composite material obtained according to the invention is characterized by taking little color upon heating. There are cases where cellulose yellows especially when wood-derived starting materials were used. This coloring can be due to the coloring of the cellulose itself or due to the coloring of substances other than the cellulose which remain depending on the degree of purification. The cellulose fibers and cellulose-fiber composite material of the invention take little color even when subjected to a heating step, and can withstand heat treatments conducted in actual steps for device production as in the case of, for example, transparent substrates for various devices.

In the case where the cellulose-fiber composite material of the invention is used as any of various transparent materials, the degree of coloring of the cellulose fibers is preferably as follows. The value of YI of the cellulose-fiber composite material, as measured in accordance with the section Examples to be given later, is preferably 30 or less, more preferably 15 or less, especially preferably 10 or less. It is preferred that the YI thereof should not increase even through heat treatments. It is preferred that the YI thereof remains at preferably 30 or less, more preferably 15 or less, especially preferably 10 or less, even after heating.

(Haze)

The cellulose-fiber composite material to be obtained according to the invention can be obtained as a cellulose-fiber composite material having high transparency, i.e., a low haze. In the case where the composite material is to be used as any of various transparent materials, the haze of this cellulose-fiber composite material is preferably 2.0 or less, more preferably 1.8 or less. It is especially preferred that the value thereof should be 1.5 or less. By regulating the haze of the composite material so as to be within that range, the composite material can be prevented from being substantially difficult to apply to, for example, transparent substrates for various devices.

The haze of a cellulose-fiber composite material can be measured, for example, with a hazeometer manufactured by Suga Test Instruments Co., Ltd., and the value obtained using the standard illuminant C is used. For example, a cellulose-fiber composite material having a thickness of 10-250 μm, preferably 10-100 μm, is subjected to the measurement.

(Total Light Transmittance)

The cellulose-fiber composite material to be obtained according to the invention can be obtained as a cellulose-fiber composite material having high transparency, i.e., a low haze. In the case where the composite material is to be used as any of various transparent materials, the total light transmittance of this cellulose-fiber composite material, as measured in the thickness direction thereof in accordance with JIS K7105 (1981), is preferably 60% or higher, more preferably 70% or higher, even more preferably 80% or higher, especially preferably 90% or higher. By regulating the total light transmittance thereof so as to be within that range, the composite material can be inhibited from being translucent or opaque and prevented from being difficult to use in applications where transparency is required.

The total light transmittance of a cellulose-fiber composite material can be measured, for example, with a hazeometer manufactured by Suga Test Instruments Co., Ltd., and the value obtained using the standard illuminant C is used. For example, a cellulose-fiber composite material having a thickness of 10-250 μm, preferably 10-100 μm, is subjected to the measurement.
(Coefficient of Linear Expansion)

The cellulose-fiber composite material to be obtained according to the invention can be obtained as a cellulose-fiber composite material having a low coefficient of linear expansion by using the cellulose, which has a low coefficient of linear expansion (elongation per K). The coefficient of linear expansion of this cellulose-fiber composite material is preferably 1-50 ppm/K, more preferably 1-30 ppm/K, especially preferably 1-20 ppm/K, most preferably 1-15 ppm/K.

In substrate applications, for example, the inorganic thin-film transistors have a coefficient of linear expansion of about 15 ppm/K. Because of this, when a cellulose-fiber composite material having a coefficient of linear expansion higher than 50 ppm/K is laminated to and composited with such an inorganic film, the resultant laminate has a large difference in linear expansion coefficient between the two layers, resulting in cracks, etc. It is therefore especially preferred that the coefficient of linear expansion of the cellulose-fiber composite material should be 1-20 ppm/K.

The coefficient of linear expansion is determined by the method which will be described later in the section Examples to be given later.
(Tensile Strength)

The cellulose-fiber composite material obtained according to the invention has a tensile strength of preferably 40 MPa or higher, more preferably 100 MPa or higher. By regulating the tensile strength thereof so as to be within that range, sufficient strength is obtained. The strength does not affect use of the composite material in applications where force is exerted thereon, e.g., structural materials.
(Tensile Modulus)

The cellulose-fiber composite material obtained according to the invention has a tensile modulus of preferably 0.2-100 GPa, more preferably 1-50 GPa, even more preferably 5.0-30 GPa. By regulating the tensile modulus thereof so as to be not less than the lower limit, sufficient strength is obtained. The strength does not affect use of the composite material in applications where force is exerted thereon, e.g., structural materials.
<Applications>

The cellulose-fiber composite material obtained according to the invention is highly transparent, has high strength, low water absorption, and high transparency, takes little color, and has a low haze and excellent optical properties. Consequently, the composite material is suitable for use in displays such as liquid-crystal displays, plasma displays, OLED displays, field emission displays, rear projection television receivers, etc., and as substrates or panels. The composite material is suitable also as substrates for solar cells such as silicon-based solar cells and dye-sensitized solar cells.

For use as a substrate, the composite material may be laminated with a barrier film, ITO, TFT, etc. In particular, the cellulose-fiber composite material obtained according to the invention takes little color even when subjected to a heat treatment, and can withstand heat treatments conducted in actual steps for device production as in the case of, for example, transparent substrates for various devices.

The cellulose-fiber composite material of the invention is suitable also for use as windowpane materials for motor vehicles, windowpane materials for railroad vehicles, windowpane materials for dwelling houses, windowpane materials for offices or factories, and the like. In the case of use as a windowpane material, the composite material may be coated or laminated with a film, such as, for example, a fluororesin coating or a hardcoat film, or with an impact-resistant or light-resistant material according to need.

Furthermore, the cellulose-fiber composite material of the invention can be used also as a structure other than those for transparent-material applications, while taking advantage of the properties thereof such as a low coefficient of linear expansion and high modulus of elasticity or high strength. In particular, the composite material is suitable for use as automotive materials such as interior materials, external plates, and bumpers, the housings of personal computers, parts for domestic electrical appliances, packaging materials, building materials, materials for civil engineering works, materials for fisheries, industrial materials, etc.

EXAMPLES

The invention will be explained below in more detail by reference to Examples and Comparative Examples. However, the invention should not be construed as being limited by the following Examples unless the invention departs from the spirit thereof.

The YI of each cellulose fiber assembly obtained according to the invention and the cellulose content, YI, haze, total light transmittance, and coefficient of linear expansion of each cellulose-fiber composite material were determined by the following methods.
[Cellulose Content in Cellulose-Fiber Composite Material]

The cellulose content (% by weight) was determined from the weight of the cellulose fiber assembly which had been composited and from the weight of the cellulose-fiber composite material obtained.
[YI of Cellulose Fiber Assembly and YI of Cellulose-Fiber Composite Material]

The YI was measured using a color computer manufactured by Suga Test Instruments. Large values of YI indicate high coloration.
[Haze of Cellulose-Fiber Composite Material]

The haze was measured with a hazeometer manufactured by Suga Test Instruments, using the standard illuminant C.
[Total Light Transmittance of Cellulose-Fiber Composite Material]

The total light transmittance was measured with a hazeometer manufactured by Suga Test Instruments and using the standard illuminant C, in accordance with JIS K7105 (1981).
[Coefficient of Linear Expansion of Cellulose-Fiber Composite Material]

A cellulose-fiber composite material which had undergone a 4-hour heat treatment at 200° C. was cut into a size of 3 mm (width)×40 mm (length) with a laser cutter. This test specimen was examined using TMA 6100, manufactured by SII, in the tensile mode in a nitrogen atmosphere under the conditions of a chuck-to-chuck distance of 20 mm and a load of 10 g, in such a manner that the test specimen was heated from room temperature to 180° C. at 5° C./min, subsequently cooled from 180° C. to 25° C. at 5° C./min, and further heated from 25° C. to 180° C. at 5° C./min. The coefficient of linear expansion was determined from the values measured during the second heating from 60° C. to 100° C.

With respect to Comparative Example I-3 and Examples IV-1, IV-3, IV-5, IV-7, and IV-9, the coefficient of linear expansion was determined from the values measured during the second heating from 60° C. to 100° C. in an examination in which the test specimen was heated from room temperature to 180° C. at 5° C./min, subsequently cooled from 180° C. to −10° C. at 5° C./min, and further heated from −10° C. to 220° C. at 5° C./min.

Example I-1

Ozone Oxidation Treatment of Raw Cellulose Fibers

Hardwood bleached kraft pulp (hereinafter abbreviated to LBKP) was used as raw cellulose fibers. This LBKP had a carboxy group content of 0.06 mmol/g.

A 200 g portion of the LBKP (solid content, 20% by weight; water content, 80% by weight; 40 g in terms of absolute-dry cellulose) was suspended in 500 mL of 0.1 M sulfuric acid, and the suspension was stirred. The suspension was vacuum-filtered with filter paper to obtain LBKP wetted with dilute sulfuric acid. This LBKP was placed in a separable flask and exposed for 5 hours to a stream of ozone-containing oxygen gas (gas flow rate, 2 L/min; ozone concentration, 32 g/m$^3$; ozone generation rate, 4 g/hr) generated by an ozone gas generator (Type ED-OG-A10, manufactured by Ecodesign Inc.).

Thereafter, the LBKP was taken out of the separable flask and repeatedly subjected to suspension washing with ion-exchanged water; the washing was terminated at the time when the pH of the washings became 4.5 or higher. Subsequently, the suspension was vacuum-filtered with filter paper to obtain cellulose fibers A (solid concentration, 20% by weight). The cellulose fibers A had a carboxy group content of 0.10 mmol/g, and the total content of carboxy groups and formyl groups therein was 0.13 mmol/g. Incidentally, the ozone treatment was conducted at ordinary temperature (about 25° C.).

Additional Oxidation Treatment

Onto 50 g of the cellulose fibers A (10 g in terms of absolute-dry cellulose fibers) was poured 150 g of 2% by weight aqueous sodium chlorite solution having a pH adjusted to 4. The resultant mixture was stirred and then allowed to stand still at room temperature for 48 hours to conduct an additional oxidation treatment. The LBKP which had undergone the additional oxidation treatment was repeatedly subjected to suspension washing with ion-exchanged water; the washing was terminated at the time when the pH of the washings became 8 or less. Subsequently, the suspension was vacuum-filtered with filter paper to obtain cellulose fibers B (solid concentration, 20% by weight). The cellulose fibers B had a carboxy group content of 0.13 mmol/g, and no formyl groups were detected therein. Incidentally, the additional oxidation treatment also was conducted at ordinary temperature (about 25° C.).

Chemical Modification Treatment

In 75 mL of acetic acid were suspended 15 g of the cellulose fibers B (3 g in terms of absolute-dry cellulose fibers). Thereafter, the suspension was vacuum-filtered with filter paper. Thus, an operation was conducted in which the water contained in the LBKP was displaced by acetic acid. The LBKP in which the water had been displaced by acetic acid was placed in a 100 mL four-necked flask, and 30 mL of acetic acid and 30 mL of acetic anhydride were added thereto. The atmosphere in the flask was replaced with nitrogen gas, and the contents were heated to 115° C. and reacted for 5 hours.

After the reaction, the acetic acid and the acetic anhydride were removed from the LBKP by filtration, and the LBKP was suspended-washed with methanol. Thereafter, the LBKP was repeatedly subjected to suspension washing with ion-exchanged water; the washing was terminated at the time when the pH of the washings became 4.5 or higher. Subsequently, the suspension was vacuum-filtered with filter paper to obtain cellulose fibers C (solid concentration, 20% by weight). The cellulose fibers C had a carboxy group content of 0.11 mmol/g (no formyl groups were detected), and had a degree of substitution with acetyl groups of 0.71.

Fibrillation Treatment

The cellulose fibers C obtained were added to water to obtain a 0.5% by weight aqueous suspension. This suspension was treated with a high-speed rotation type homogenizer ("Clearmix 0.8S", manufactured by M Technique Co., Ltd.) at 20,000 rpm for 1 hour.

Production of Cellulose Fiber Assembly

The solid concentration of the dispersion of fibrillated cellulose fibers obtained by the fibrillation treatment was regulated to 0.127% by weight, and 150 mL of the resultant dispersion (which contained 0.19 g of the fibrillated cellulose fibers) was subjected to suction filtration with a membrane filter made of PTFE (pare diameter, 1 μm; effective filtration area, 47.5 cm$^2$). The cellulose fiber assembly thus obtained was dried with a pressing machine (120° C.) for 5 minutes to obtain a cellulose fiber assembly having a basis weight of about 40 g/m$^2$. This fiber assembly had a thickness of 56 μm.

The proportion in percent of the amount of cellulose fibers (0.1847 g) present in the cellulose fiber assembly obtained to the amount of the cellulose fibers (0.19 g) contained in the dispersion of fibrillated cellulose fibers which had been subjected to the filtration in the operation shown above was determined as "yield in sheet formation by filtration".

Production of Cellulose-Fiber Composite Material

The cellulose fiber assembly obtained was immersed in a solution obtained by mixing 100 parts by weight of 1,10-decanediol diacrylate with 0.02 parts by weight of 2,4,6-trimethylbenzoyldiphenylphosphine oxide ("Lucirin TPO", manufactured by BASF A.G.) and 0.01 part by weight of benzophenone, and was kept in the immersed state overnight at a reduced pressure.

The cellulose fiber assembly impregnated with the resin solution was sandwiched between two glass plates and subjected to ultraviolet curing using an electrodeless mercury lamp ("D Bulb", manufactured by Fusion UV Systems, Inc.). The ultraviolet curing was conducted under the following conditions. The sandwich structure was passed through the line at an irradiance, as measured at 365 nm wavelength, of 400 mW/cm$^2$ and a line speed of 7 m/min two times respectively for the front and the back sides to half cure the resin, and was subsequently passed through the line at an irradiance, as measured at 365 nm wavelength, of 1,900 mW/cm$^2$ and a line speed of 2 m/min two times for each of the front and the back sides (four times in total) to completely cure the resin. After the ultraviolet curing, the glass plates were removed to obtain a cellulose-fiber composite material.

This cellulose-fiber composite material had a thickness of 89 μm. This cellulose-fiber composite material had a haze of 32.75 and a YI of 1.68. After having undergone a 4 hour heat treatment in a 200° C. oven (nitrogen gas atmosphere), the cellulose-fiber composite material had a haze of 34.52 and a YI of 6.79. Details of the results are summarized in Tables 1A and 1B.

Comparative Example I-1

The same LBKP as in Example I-1 was used as raw cellulose fibers. Without being subjected to an ozone oxidation treatment, additional oxidation treatment, and chemical modification treatment, the LBKP was directly converted to a 0.5% by weight aqueous suspension. This suspension was subjected to a fibrillation treatment, suction filtration, and drying by the methods described in Example I-1, thereby obtaining a cellulose fiber assembly. Thereafter, a cellulose-fiber composite material was obtained in the same manner. Details of the results are summarized in Tables 1A and 1B.

Comparative Example I-2

The same LBKP as in Example I-1 was used as raw cellulose fibers. Without being subjected to an ozone oxidation treatment, the LBKP was subjected only to an additional oxidation treatment by the method described in Example I-1. The cellulose fibers D thus obtained had a carboxy group content of 0.06 mmol/g, which had not changed through the additional oxidation.

The cellulose fibers D were converted to a 0.5% by weight aqueous suspension, and this suspension was subjected to a fibrillation treatment, suction filtration, and drying by the methods described in Example I-1, thereby obtaining a cellulose fiber assembly. Thereafter, a cellulose-fiber composite material was obtained in the same manner. Details of the results are summarized in Tables 1A and 1B.

Comparative Example I-3

The same LBKP as in Example I-1 was used as raw cellulose fibers. Without being subjected to an ozone oxidation treatment and an additional oxidation treatment, the LBKP was subjected only to a chemical modification treatment by the method described in Example I-1. The cellulose fibers E thus obtained had a carboxy group content of 0.05 mmol/g as a result of an increase in the molecular weight of the cellulose due to the chemical modification treatment. The cellulose fibers E had a degree of substitution with acetyl groups of 0.90.

The cellulose fibers E were converted to a 0.5% by weight aqueous suspension, and this suspension was subjected to a fibrillation treatment, suction filtration, and drying by the methods described in Example I-1, thereby obtaining a cellulose fiber assembly. Thereafter, a cellulose-fiber composite material was obtained in the same manner. Details of the results are summarized in Tables 1A and 1B.

Comparative Examples I-4 and I-5

The cellulose fibers A obtained in Example I-1 through an ozone oxidation treatment only and the cellulose fibers B obtained in Example I-1 through an ozone oxidation treatment and an additional oxidation treatment only had carboxy group contents of 0.10 mmol/g and 0.13 mmol/g, respectively. The total content of carboxy groups and formyl groups in each of these two cellulose materials was 0.13 mmol/g.

The cellulose fibers A (Comparative Example I-4) and the cellulose fibers B (Comparative Example I-5) were converted respectively to 0.5% by weight aqueous suspensions. The suspensions were subjected to a fibrillation treatment, suction filtration, and drying by the methods described in Example I-1 to obtain cellulose fiber assemblies. Thereafter, cellulose-fiber composite materials were obtained in the same manner. Detailed of the results are summarized in Tables 1A and 1B.

Comparative Examples I-6 and I-7

An ozone oxidation treatment, additional oxidation treatment, and chemical modification treatment were conducted by the same methods as described in Example I-1, except that the period of exposure to the stream of ozone-containing oxygen gas in the ozone oxidation treatment step was changed to 1 hour (Comparative Example I-6) or 2 hours (Comparative Example I-7).

The cellulose fibers F (exposure period, 1 hour) and cellulose fibers G (exposure period, 2 hours) thus obtained had carboxy group contents of 0.06 mmol/g (no formyl groups were detected) and 0.07 mmol/g (no formyl groups were detected), respectively, and had degrees of substitution with acetyl groups of 0.60 and 0.66, respectively.

The cellulose fibers F and the cellulose fibers G were converted respectively to 0.5% by weight aqueous suspensions. The suspensions were subjected to a fibrillation treatment, suction filtration, and drying by the methods described in Example I-1 to obtain cellulose fiber assemblies. Thereafter, cellulose-fiber composite materials were obtained in the same manner. Detailed of the results are summarized in Tables 1A and 1B.

Example II-1

The aqueous fibrillated-cellulose-fiber suspension having a concentration of about 0.5% in terms of % by weight which had been obtained in Example I-1 by subjecting the aqueous suspension of cellulose fibers C to a 1-hour treatment with a high-speed rotation type homogenizer at 20,000 rpm was centrifuged at 18,000 rpm (38,900 G) for 10 minutes to obtain a supernatant. The supernatant obtained contained fibrillated cellulose fibers, and the solid (cellulose fiber) concentration in the supernatant was 0.0871% by weight. The recovery through centrifugation of the fibrillated cellulose fibers in this operation was determined using the following equation. As a result, the recovery thereof was found to be 16.9%.

$$\text{Recovery through centrifugation (\%)} = \frac{\text{amount of cellulose in supernatent}}{\text{amount of cellulose in feed liquid}} = \frac{(W_1 - W_2) \times C_1}{(W_1 - W_0) \times C_0} \times 100\%$$

[Math. 2]

$C_0$: cellulose fiber concentration of aqueous fibrillated-cellulose-fiber suspension before centrifugation
$C_1$: cellulose fiber concentration of supernatant
$W_0$: mass of centrifuging tube
$W_1$: mass of centrifuging tube+liquid
$W_2$: mass of centrifuging tube+precipitate Furthermore, 35.0 g of the supernatant obtained was subjected to suction filtration with a membrane filter made of PTFE (pore diameter, 1 μm; effective filtration area, 11.3 cm$^2$) and drying with a pressing machine (120° C.) in the same manner as in Example I-1 to obtain a cellulose fiber assembly having a basis weight of about 40 g/m$^2$ and a thickness of 35 μm. The yield in sheet formation by filtration in this operation was determined using the following equation. As a result, the yield was found to be 84.3%.

$$\text{Yield in sheet formation by filtration (\%)} = \frac{\text{mass of cellulose fiber assembly (g)}}{[\text{solid concentration of supernatant (\%)}] \times [\text{amount of supernatant (g)}]} \times 100$$

[Math. 3]

The overall yield of the fibrillated cellulose fibers is determined as the product of the recovery through centrifugation and the yield in sheet formation. The overall yield was determined in accordance with the following equation, and was found to be 14.2%.

Overall yield(%)=[recovery through centrifugation (%)]×[yield in sheet formation(%)]/100

Using the cellulose fiber assembly obtained above, a cellulose-fiber composite material was obtained in the same manner as in Example I-1.

This cellulose-fiber composite material had a haze of 0.92, a total light transmittance of 91.64%, and a YI of 0.92. After having undergone a 4 hour heat treatment in a 200° C. oven (nitrogen gas atmosphere), the composite material had a haze of 0.93, a total light transmittance of 89.38%, a YI of 8.2, and a coefficient of linear expansion of 10.6 ppm/K. Details of the results are summarized in Tables 2A and 2B.

Comparative Example II-1

In the same manner as in Comparative Example I-1, LBKP as raw cellulose fibers was directly converted to an aqueous suspension having a concentration of about 0.5% by weight, without being subjected to an ozone oxidation treatment, additional oxidation treatment, and chemical modification treatment. An aqueous fibrillated-cellulose suspension having a concentration of about 0.5% by weight was obtained in the same manner, and this suspension was centrifuged to obtain a supernatant in the same manner as in Example II-1. This supernatant was subjected to suction filtration with a membrane filter made of PTFE (pore diameter, 1 μm; effective filtration area, 11.3 cm$^2$) and then dried to obtain a cellulose fiber assembly having a basis weight of about 40 g/m$^2$. Thereafter, a cellulose-fiber composite material was obtained in the same manner. Details of the results are summarized in Tables 2A and 2B.

Comparative Example II-2

Cellulose fibers D (carboxy group content, 0.06 mmol/g) obtained by subjecting LBKP as raw cellulose fibers to an additional oxidation treatment only, without giving an ozone oxidation treatment thereto, in the same manner as in Comparative Example I-2 were converted to an aqueous suspension having a concentration of about 0.5% by weight. An aqueous fibrillated-cellulose suspension having a concentration of about 0.5% by weight was obtained in the same manner, and this suspension was centrifuged to obtain a supernatant in the same manner as in Example II-1. This supernatant was subjected to suction filtration with a membrane filter made of PTFE (pore diameter, 1 μm; effective filtration area, 11.3 cm$^2$) and then dried to obtain a cellulose fiber assembly having a basis weight of about 40 g/m$^2$. Thereafter, a cellulose-fiber composite material was obtained in the same manner. Details of the results are summarized in Tables 2A and 2B.

Comparative Example II-3

Cellulose fibers E (carboxy group content, 0.05 mmol/g (no formyl groups were detected); degree of substitution, 0.90) obtained by subjecting LBKP as raw cellulose fibers to a chemical modification treatment only, without giving an ozone oxidation treatment and an additional oxidation treatment thereto, in the same manner as in Comparative Example I-3 were converted to an aqueous suspension having a concentration of about 0.5% by weight. An aqueous fibrillated-cellulose suspension having a concentration of about 0.5% by weight was obtained in the same manner, and this suspension was centrifuged to obtain a supernatant in the same manner as in Example II-1. This supernatant was subjected to suction filtration with a membrane filter made of PTFE (pore diameter, 1 μm; effective filtration area, 11.3 cm$^2$) and then dried to obtain a cellulose fiber assembly having a basis weight of about 40 g/m$^2$. Thereafter, a cellulose-fiber composite material was obtained in the same manner. Details of the results are summarized in Tables 2A and 2B.

Comparative Examples II-4 and II-5

Cellulose fibers A (carboxy group content, 0.10 mmol/g; total content of carboxy groups and formyl groups, 0.13 mmol/g) obtained through an ozone oxidation treatment only and cellulose fibers B (carboxy group content, 0.13 mmol/g; total content of carboxy groups and formyl groups, 0.13 mmol/g) obtained through an ozone oxidation treatment and an additional oxidation treatment only, in the same manners as in Comparative Examples I-4 and I-5, were converted respectively to about 0.5% by weight aqueous suspensions. Aqueous fibrillated-cellulose suspensions having a concentration of about 0.5% by weight were obtained in the same manner, and these suspensions were centrifuged to obtain supernatants in the same manner as in Example II-1. These supernatants were subjected to suction filtration with a membrane filter made of PTFE (pore diameter, 1 μm; effective filtration area, 11.3 cm$^2$) and then dried to obtain cellulose fiber assemblies having a basis weight of about 40 g/m$^2$. Thereafter, cellulose-fiber composite materials were obtained in the same manner. Details of the results are summarized in Tables 2A and 2B.

Comparative Examples II-6 and II-7

Cellulose fibers F (carboxy group content, 0.06 mmol/g (no formyl groups were detected); degree of substitution, 0.60) and cellulose fibers G (carboxy group content, 0.07 mmol/g (no formyl groups were detected); degree of substitution, 0.66) both obtained in the same manners as in Comparative Examples I-6 and I-7 by conducting an ozone oxidation treatment, additional oxidation treatment, and chemical modification treatment by the same methods as described in Example I-1, except that the period of exposure to the stream of ozone-containing oxygen gas in the ozone oxidation treatment step was changed to 1 hour or to 2 hours were converted respectively to about 0.5% by weight aqueous suspensions. Aqueous fibrillated-cellulose suspensions having a concentration of about 0.5% by weight were obtained in the same manner, and these suspensions were centrifuged to obtain supernatants in the same manner as in Example II-1. These supernatants were subjected to suction filtration with a membrane filter made of PTFE (pore diameter, 1 μm; effective filtration area, 11.3 cm$^2$) and then dried to obtain cellulose fiber assemblies having a basis weight of about 40 g/m$^2$. Thereafter, cellulose-fiber composite materials were obtained in the same manner. Details of the results are summarized in Tables 2A and 2B.

TABLE 1A

| | Items concerning cellulose fibers | | | |
| --- | --- | --- | --- | --- |
| | Carboxy group content (mmol/g) | Total content of carboxy and formyl groups (mmol/g) | Chemical modification group | Degree of substitution |
| Example I-1 | 0.11 | 0.11 | acetyl | 0.71 |
| Comparative Example I-1 | 0.06 | 0.06 | none | — |
| Comparative Example I-2 | 0.06 | 0.06 | none | — |
| Comparative Example I-3 | 0.05 | 0.05 | acetyl | 0.90 |
| Comparative Example I-4 | 0.10 | 0.13 | none | — |
| Comparative Example I-5 | 0.13 | 0.13 | none | — |
| Comparative Example I-6 | 0.06 | 0.06 | acetyl | 0.60 |
| Comparative Example I-7 | 0.07 | 0.07 | acetyl | 0.66 |

TABLE 1B

| | Item concerning cellulose fiber | Items concerning cellulose-fiber composite material | Property values of cellulose-fiber composite material | | | | | | |
|---|---|---|---|---|---|---|---|---|---|
| | | | Before heating | | | After 200° C. × 4 hr heating | | | |
| | assembly Thickness (μm) | Thickness (μm) | Cellulose content (mass %) | Haze | Total light transmittance (%) | YI | Coefficient of linear expansion (ppm/K) | Haze | Total light transmittance (%) | YI |
| Example I-1 | 56 | 89 | 37 | 32.75 | 89.03 | 1.68 | 10.5 | 34.52 | 88.19 | 6.79 |
| Comparative Example I-1 | 100 | 140 | 28 | 77.07 | 89.19 | 4.72 | 27.4 | 84.25 | 83.78 | 18.61 |
| Comparative Example I-2 | 67 | 86 | 30 | 57.02 | 88.91 | 3.03 | — | 62.90 | 80.91 | 22.31 |
| Comparative Example I-3 | 70 | 105 | 34 | 47.73 | 87.02 | 2.74 | — | 52.32 | 86.95 | 5.90 |
| Comparative Example I-4 | 80 | 75 | 31 | 62.03 | 88.57 | 3.14 | 15.6 | 67.84 | 76.40 | 31.66 |
| Comparative Example I-5 | 74 | 110 | 30 | 35.16 | 88.22 | 2.80 | 23.0 | 45.10 | 60.21 | 70.81 |
| Comparative Example I-6 | 57 | 89 | 31 | 42.10 | 89.41 | 1.79 | — | 41.54 | 88.73 | 3.96 |
| Comparative Example I-7 | 76 | 110 | 33 | 46.05 | 89.37 | 1.85 | — | 47.83 | 88.95 | 4.79 |

TABLE 2A

| | Items concerning recovery | | | Item concerning filtration of cellulose |
|---|---|---|---|---|
| | Recovery through centrifugation (%) | Yield in sheet formation by filtration (%) | Overall yield (%) | fiber dispersion Period required for filtration (hours:minutes) |
| Example II-1 | 16.9 | 84.3 | 14.2 | 1:35 |
| Comparative Example II-1 | 13.0 | 63.4 | 8.2 | 8:30 |
| Comparative Example II-2 | 20.0 | 62.8 | 12.6 | 8:50 |
| Comparative Example II-3 | 16.1 | 40.2 | 6.5 | 5:45 |
| Comparative Example II-4 | 10.0 | 81.7 | 8.2 | 3:50 |
| Comparative Example II-5 | 34.2 | 90.7 | 31.0 | 4:35 |
| Comparative Example II-6 | 15.7 | 48.7 | 7.6 | 6:35 |
| Comparative Example II-7 | 16.3 | 55.8 | 9.1 | 6:35 |

TABLE 2B

| | Item concerning cellulose fiber | Items concerning cellulose-fiber composite material | Property values of cellulose-fiber composite material | | | | | | |
|---|---|---|---|---|---|---|---|---|---|
| | | | Before heating | | | After 200° C. × 4 hr heating | | | |
| | assembly Thickness (μm) | Thickness (μm) | Cellulose content (mass %) | Haze | Total light transmittance (%) | YI | Coefficient of linear expansion (ppm/K) | Haze | Total light transmittance (%) | YI |
| Example II-1 | 35 | 58 | 36 | 0.92 | 91.64 | 0.92 | 10.6 | 0.93 | 89.38 | 8.20 |
| Comparative Example II-1 | 120 | 120 | 34 | 1.82 | 89.05 | 3.40 | — | 2.33 | 79.74 | 34.80 |
| Comparative Example II-2 | 100 | 103 | 38 | 2.03 | 89.91 | 2.73 | — | 2.40 | 75.24 | 44.41 |
| Comparative Example II-3 | 64 | 99 | 40 | 1.62 | 84.57 | 4.60 | — | 1.74 | 83.50 | 8.43 |
| Comparative Example II-4 | 76 | 91 | 36 | 1.25 | 91.50 | 1.07 | — | 1.54 | 83.33 | 27.35 |
| Comparative Example II-5 | 56 | 82 | 43 | 2.50 | 91.26 | 1.40 | — | 2.67 | 55.42 | 81.89 |
| Comparative Example II-6 | 85 | 100 | 41 | 1.53 | 89.98 | 2.37 | — | 1.77 | 88.57 | 7.19 |
| Comparative Example II-7 | 77 | 107 | 42 | 1.42 | 90.20 | 2.22 | — | 1.61 | 87.84 | 10.23 |

Discussion

Whether cellulose fibers were superior in suitability for fibrillation or not can be determined from a comparison in haze between the cellulose-fiber composite materials. That cellulose fibers had excellent suitability for fibrillation means that the cellulose fibers are in a microfined state and, hence, the cellulose-fiber composite material obtained therefrom has a low haze.

As shown in Table 1B, it is apparent that the cellulose-fiber composite material of Example I-1 had a lower haze than the cellulose-fiber composite materials of Comparative Examples I-1 to I-7, and that excellent suitability for fibrillation was obtained in Example I-1. Furthermore, the YI of the cellulose-fiber composite material of Example I-1 was low before and after the heating. It has thus become obvious that the cellulose fibers of Example I-1 have excellent suitability for fibrillation and pose no problem concerning coloring.

Since the supernatant obtained by centrifuging a dispersion of fibrillated cellulose fibers contains fine fibrillated cellulose fibers only, an exceedingly transparent cellulose-fiber composite material having a haze less than 2 can be obtained therefrom. In this case, to obtain a cellulose fiber assembly in high recovery is essential from the standpoint of production cost.

As shown in Table 2A, the overall yield of the fibrillated cellulose fibers of Example II-1 is high. Namely, the results show that a composite material which has high transparency, non-discoloring properties, high heat resistance, and a low coefficient of linear expansion is obtained at low cost.

Example III

Ozone Oxidation Treatment of Raw Cellulose Fibers

The same LBKP as used in Example I-1 was placed as raw cellulose fibers in a vessel in an amount of 20 g in terms of absolute-dry cellulose, and 2 L of air was added thereto. Thereafter, 15 L of an ozone/oxygen mixture gas having an ozone concentration of 200 g/m$^3$ was added thereto. At 25° C., this vessel was shaken for 2 minutes and then allowed to stand still for 6 hours. Thereafter, the ozone and air present in the vessel were removed to complete the ozone treatment. This operation was conducted twice. The cellulose fibers thus treated were sufficiently washed and dehydrated to obtain cellulose fibers H (solid concentration, 20% by weight).

Additional Oxidation Treatment

To the cellulose fibers H was added 200 g of an aqueous sodium chlorite solution having a concentration of 0.2% by weight (the amount corresponding to 3% by weight in terms of sodium chlorite amount based on the dry weight of the cellulose fibers) which had a pH regulated to 4-5 with hydrochloric acid. The resultant mixture was stirred and then allowed to stand still at 70° C. for 3 hours to conduct an additional oxidation treatment. The cellulose fibers I thus obtained had a carboxy group content of 0.354 mmol/g (no formyl groups were detected).

Chemical Modification Treatment

The cellulose fibers I were heated, in an amount of 20 g in terms of absolute-dry cellulose fibers, in acetic anhydride at 60° C. for 1 hour to displace the water by acetic acid. Furthermore, the mixture was heated at 115° C. for 5 hours to react the cellulose fibers. After the reaction, the acetic acid and the acetic anhydride were removed by filtration, and the cellulose fibers were suspension-washed with methanol. Thereafter, the cellulose fibers were repeatedly subjected to suspension washing with ion-exchanged water; the washing was terminated at the time when the pH of the washings became 5.0 or higher.

Thereafter, the suspension was vacuum-filtered with filter paper to obtain cellulose fibers J (solid concentration, 20% by weight). The cellulose fibers J had a carboxy group content of 0.171 mmol/g (no formyl groups were detected) and a degree of substitution with acetyl groups of 1.18.

Fibrillation Treatment

The cellulose fibers J were subjected once to a step in which the cellulose fibers were dispersed in isopropanol and recovered by filtration and then subjected twice to a step in which the cellulose fibers were dispersed in methyl ethyl ketone and recovered by filtration. Thus, the water was displaced by methyl ethyl ketone. The cellulose fibers which had undergone the displacement were used to prepare a cellulose fiber dispersion so that the dispersion was composed of 3% by weight the cellulose fibers, 22% by weight methyl ethyl ketone, and 75% by weight cyclohexanone.

The dispersion obtained was treated for 1 hour with a bead mill (Ultra Apex Mill UAM-015, manufactured by Kotobuki Industries Co., Ltd.) under the conditions of a bead diameter of 0.3 mm and a peripheral speed of 11.4 m/sec. Thus, a cellulose fiber dispersion was obtained in which cellulose fibers had been dispersed.

Example IV-1

Ozone Oxidation Treatment of Raw Cellulose Fibers

The same LBKP as used in Example I-1 was used as raw cellulose fibers. This LBKP had a carboxy group content of 0.06 mmol/g.

The LBKP in the state of having a solid content of 30% by weight and a water content of 70% by weight was placed in a vessel in an amount of 20 g in terms of absolute-dry cellulose. Thereto was added 5.25 L of an ozone/oxygen mixture gas having an ozone concentration of 200 g/m$^3$. This vessel was shaken for 2 minutes at 25° C. and allowed to stand still for 6 hours. Thereafter, the ozone and air present in the vessel were removed to complete the ozone reaction. After completion of the reaction, the cellulose fibers were suspension-washed with ion-exchanged water, and the suspension washing was repeated until the pH of the washings became 6 or higher. Thus, cellulose fibers K were obtained.

Additional Oxidation Treatment

To 100 g of the cellulose fibers K (20 g in terms of absolute-dry weight) was added 200 g of 0.3% by weight aqueous sodium chlorite solution (the amount corresponding to 3% by weight in terms of sodium chlorite amount based on the absolute-dry weight of the cellulose fibers) which had a pH regulated to 4-5 with hydrochloric acid. The cellulose fibers were treated at 70° C. for 3 hours to conduct an additional oxidation treatment. After completion of the reaction, the cellulose fibers were suspension-washed with ion-exchanged water, and the suspension washing was repeated until the pH of the washings became 6 or higher. The suspension was vacuum-filtered with filter paper to obtain cellulose fibers L (solid concentration, about 20% by weight).

Chemical Modification Treatment

Twenty grams of the cellulose fibers L (5 g in terms of dry cellulose fibers) were placed in a four-necked separable flask, and 32 g of acetic acid and 130 g of acetic anhydride were added thereto. The atmosphere in the flask was replaced with nitrogen gas. Thereafter, the contents were heated to 60° C. and held for 1 hour. Subsequently, the contents were heated to 105° C. and reacted for 3 hours. After the reaction, the acetic acid and the acetic anhydride were removed from the cellulose fibers by filtration, and the cellulose fibers were repeatedly subjected to suspension washing with methanol three times. Thereafter, suspension washing with ion-exchanged water was repeated; the washing was terminated at the time when the pH of the washings became 5 or higher. The resultant suspension was vacuum-filtered with filter paper to obtain cellulose fibers M (solid concentration, about 30% by weight). The cellulose fibers M had a carboxy group content of 0.16 mmol/g (no formyl groups were detected) and a degree of substitution with acetyl groups of 0.61.

Fibrillation Treatment

The cellulose fibers M obtained were added to water to obtain a 0.5% by weight aqueous suspension. This suspension was treated with a high-speed rotation type homogenizer ("Clearmix 0.8S", manufactured by M Technique Co., Ltd.) at 20,000 rpm for 1 hour to obtain fibrillated cellulose fibers (dispersion).

Production of Cellulose Fiber Assembly

The solid concentration of the dispersion of fibrillated cellulose fibers obtained by the fibrillation treatment was regulated to 0.127% by weight, and the resultant dispersion was subjected to suction filtration with a membrane filter made of PTFE (pare diameter, 1.0 μm). The cellulose fibers were thereafter dried with a pressing machine at 120° C. for 5 minutes to obtain a cellulose fiber assembly (cellulose fiber sheet) having a basis weight of about 40 g/m².

Production of Cellulose-Fiber Composite Material

This cellulose fiber assembly was immersed in a resin solution obtained by mixing 100 parts by weight of 1,10-decanediol diacrylate with 0.02 parts by weight of 2,4,6-trimethylbenzoyldiphenylphosphine oxide ("Lucirin TPO", manufactured by BASF A.G.) and 0.01 part by weight of benzophenone, and was kept in the immersed state for 1 hour at 40° C. and a reduced pressure.

The cellulose fiber assembly impregnated with the resin solution was sandwiched between two glass plates and subjected to ultraviolet curing using an electrodeless mercury lamp ("D Bulb", manufactured by Fusion UV Systems, Inc.). The ultraviolet curing was conducted under the following conditions. The sandwich structure was passed through the line at an irradiance, as measured at 365 nm wavelength, of 400 mW/cm² and a line speed of 7 m/min two times respectively for the front and the back sides to half cure the resin, and was subsequently passed through the line at an irradiance, as measured at 365 nm wavelength, of 1,900 mW/cm² and a line speed of 2 m/min two times for each of the front and the back sides (four times in total) to completely cure the resin. After the ultraviolet curing, the glass plates were removed to obtain a cellulose-fiber composite material.

This cellulose-fiber composite material was heat-treated in an oven at 200° C. in a nitrogen atmosphere for 4 hours. The cellulose-fiber composite material thus obtained (thickness, 58 μm) had an average coefficient of linear expansion for 60-100° C. of 11.5 ppm/K.

Example IV-2

Production of Supernatant by Centrifugation

The dispersion of fibrillated cellulose fibers obtained in Example IV-1 by subjecting a 0.5% by weight aqueous suspension of the cellulose fibers M to the fibrillation treatment (0.5% % by weight aqueous suspension which had undergone 1 hour treatment with a high-speed rotation type homogenizer at 20,000 rpm) was centrifuged at 18,000 rpm (38,900 G) for 10 minutes to obtain a supernatant.

Cellulose Fiber Assembly from the Supernatant

The supernatant obtained above was subjected to suction filtration using a membrane filter made of PTFE (pore diameter, 1.0 μm). Thereafter, the cellulose fibers were dried with a pressing machine at 120° C. for 5 minutes to obtain a cellulose fiber assembly having a basis weight of about 40 g/m². The overall yield thereof was determined in the same manner as in Example II-1, and was found to be 17.6%.

Production of Cellulose-Fiber Composite Material

The cellulose fiber assembly obtained was subjected to impregnation with a resin solution, ultraviolet curing, and a heat treatment with oven in the same manner as in Example IV-1 to produce a cellulose-fiber composite material.

The cellulose-fiber composite material obtained (thickness, 95 μm) had a haze of 1.61, a total light transmittance of 82.58%, and a YI of 29.83.

Example IV-3

Chemical Modification Treatment

Twenty grams of the cellulose fibers L obtained through the additional oxidation treatment in Example IV-1 (5 g in terms of absolute-dry cellulose fibers) were subjected to the same chemical modification treatment as in Example IV-1, except that the reaction after the addition of acetic acid and acetic anhydride and after the replacement with nitrogen gas was conducted by holding the mixture at an elevated temperature of 60° C. for 1 hour, subsequently heating the mixture to 115° C., and reacting the mixture for 2 hours. Thus, cellulose fibers N (solid concentration, about 30% by weight) were obtained. The cellulose fibers N had a carboxy group content of 0.18 mmol/g (no formyl groups were detected) and a degree of substitution with acetyl groups of 0.75.

Fibrillation Treatment, and Production of Cellulose Fiber Assembly and Cellulose-Fiber Composite Material The cellulose fibers N obtained were subjected to a fibrillation treatment and production of a cellulose fiber assembly (suction filtration and drying) in the same manner as in Example IV-1, and the resultant cellulose fiber assembly was subjected to cellulose-fiber composite material production therefrom (impregnation with resin solution, ultraviolet curing, and oven heating) in the same manner as in Example IV-1. Thus, a cellulose-fiber composite material was obtained.

The cellulose-fiber composite material obtained (thickness, 99 μm) had an average coefficient of linear expansion for 60-100° C. of 13.5 ppm/K.

Example IV-4

Production of Supernatant by Centrifugation, and Production of Cellulose Fiber Assembly and Cellulose-Fiber Composite Material from the Supernatant The dispersion of fibrillated cellulose fibers obtained in Example IV-3 through the fibrillation treatment of the cellulose fibers N was centrifuged in the same manner as in Example IV-2 to obtain a supernatant. This supernatant was subjected to production of a cellulose fiber assembly (suction filtration and drying) in the same manner as in Example IV-2, and the resultant cellulose fiber assembly was subjected to cellulose-fiber composite material production therefrom (impregnation with resin solution, ultraviolet curing, and oven heating) in the same manner as in Example IV-2. Thus, a cellulose-fiber composite material was obtained.

The cellulose-fiber composite material obtained (thickness, 105 μm) had a haze of 1.98, a total light transmittance of 84.87%, and a YI of 21.66. The overall yield thereof was determined in the same manner as in Example IV-2, and was found to be 18.5%.

Example IV-5

Chemical Modification Treatment

Twenty grams of the cellulose fibers L obtained through the additional oxidation treatment in Example IV-1 (5 g in terms of absolute-dry cellulose fibers) were subjected to the same chemical modification treatment as in Example IV-1, except that the reaction after the addition of acetic acid and acetic anhydride and after the replacement with nitrogen gas was conducted by holding the mixture at an elevated temperature of 60° C. for 1 hour, subsequently heating the mixture to 115° C., and reacting the mixture for 3 hours. Thus, cellulose fibers O (solid concentration, about 30% by weight) were obtained. The cellulose fibers O had a carboxy group content of 0.14 mmol/g (no formyl groups were detected) and a degree of substitution with acetyl groups of 0.91.

Fibrillation Treatment, and Production of Cellulose Fiber Assembly and Cellulose-Fiber Composite Material The cellulose fibers O obtained were subjected to a fibrillation treatment and production of a cellulose fiber assembly (suction filtration and drying) in the same manner as in Example IV-1, and the resultant cellulose fiber assembly was subjected to cellulose-fiber composite material production therefrom (impregnation with resin solution, ultraviolet curing, and oven heating) in the same manner as in Example IV-1. Thus, a cellulose-fiber composite material was obtained.

The cellulose-fiber composite material obtained (thickness, 80 μm) had an average coefficient of linear expansion for 60-100° C. of 13.3 ppm/K.

Example IV-6

Production of Supernatant by Centrifugation, and Production of Cellulose Fiber Assembly and Cellulose-Fiber Composite Material from the Supernatant The dispersion of fibrillated cellulose fibers obtained in Example IV-5 through the fibrillation treatment of the cellulose fibers O was centrifuged in the same manner as in Example IV-2 to obtain a supernatant. This supernatant was subjected to production of a cellulose fiber assembly (suction filtration and drying) in the same manner as in Example IV-2, and the resultant cellulose fiber assembly was subjected to cellulose-fiber composite material production therefrom (impregnation with resin solution, ultraviolet curing, and oven heating) in the same manner as in Example IV-2. Thus, a cellulose-fiber composite material was obtained.

The cellulose-fiber composite material obtained (thickness, 105 μm) had a haze of 1.53, a total light transmittance of 86.44%, and a YI of 18.62. The overall yield thereof was determined in the same manner as in Example IV-2, and was found to be 17.0%.

Example IV-7

Chemical Modification Treatment

Thirty-five grams of the cellulose fibers L (8 g in terms of absolute-dry cellulose fibers) obtained in Example IV-1 through the additional oxidation treatment were suspended in 300 g of acetic acid. Thereafter, the suspension was vacuum-filtered with filter paper. Thus, an operation was conducted in which the water contained in the cellulose fibers L was displaced by acetic acid.

Thereafter, the cellulose fibers L were placed in a four-necked separable flask. Thereto were added 240 g of acetic acid, 8.1 g of sodium acetate, and 16.9 g of benzoyl chloride. After the atmosphere in the flask was replaced with nitrogen gas, the contents were heated to 80° C. and reacted for 2 hours.

After the reaction, the reaction liquid was removed from the cellulose fibers by filtration, and the cellulose fibers were repeatedly suspension-washed with methanol three times. Thereafter, the cellulose fibers were repeatedly subjected to suspension washing with ion-exchanged water; the washing was terminated at the time when the pH of the washings became 5 or higher. The resultant suspension was vacuum-filtered with filter paper to obtain cellulose fibers P (solid concentration, about 30% by weight).

The cellulose fibers P had a carboxy group content of 0.11 mmol/g (no formyl groups were detected) and a degree of substitution with benzoyl groups of 1.03.

Fibrillation Treatment, and Production of Cellulose Fiber Assembly and Cellulose-Fiber Composite Material The cellulose fibers P obtained were subjected to a fibrillation treatment and production of a cellulose fiber assembly (suction filtration and drying) in the same manner as in Example IV-1, and the resultant cellulose fiber assembly was subjected to cellulose-fiber composite material production therefrom (impregnation with resin solution, ultraviolet curing, and oven heating) in the same manner as in Example IV-1. Thus, a cellulose-fiber composite material was obtained.

The cellulose-fiber composite material obtained (thickness, 80 μm) had an average coefficient of linear expansion for 60-100° C. of 16.6 ppm/K.

Example IV-8

Production of Supernatant by Centrifugation, and Production of Cellulose Fiber Assembly and Cellulose-Fiber Composite Material from the Supernatant The dispersion of fibrillated cellulose fibers obtained in Example IV-7 through the fibrillation treatment of the cellulose fibers P was centrifuged in the same manner as in Example IV-2 to obtain a supernatant. This supernatant was subjected to production of a cellulose fiber assembly (suction filtration and drying) in the same manner as in Example IV-2, and the resultant cellulose fiber assembly was subjected to cellulose-fiber composite material production therefrom (impregnation with resin solution, ultraviolet curing, and oven heating) in the same manner as in Example IV-2. Thus, a cellulose-fiber composite material was obtained.

The cellulose-fiber composite material obtained (thickness, 124 μm) had a haze of 1.15, a total light transmittance of 88.75%, and a YI of 17.45. The overall yield thereof was determined in the same manner as in Example IV-2, and was found to be 11.3%.

Example IV-9

Chemical Modification Treatment

Twenty grams of the cellulose fibers L (5 g in terms of absolute-dry cellulose fibers) obtained in Example IV-1 through the additional oxidation treatment were placed in a four-necked separable flask. Thereto was added 133 g of propionic anhydride. After the atmosphere in the flask was replaced with nitrogen gas, the contents were heated to 60° C. and held for 1 hour.

Subsequently, the contents were heated to 115° C. and reacted for 3 hours. After the reaction, the solvent was removed from the cellulose fibers by filtration, and the cellulose fibers were repeatedly suspension-washed with methanol three times. Thereafter, suspension washing with ion-exchanged water was repeated; the washing was terminated at the time when the pH of the washings became 5 or higher. The resultant suspension was vacuum-filtered with filter paper to obtain cellulose fibers S (solid concentration, about 30% by weight).

The cellulose fibers S had a carboxy group content of 0.13 mmol/g (no formyl groups were detected) and a degree of substitution with propionyl groups of 0.53.

Fibrillation Treatment, and Production of Cellulose Fiber Assembly and Cellulose-Fiber Composite Material The cellulose fibers S obtained were subjected to a fibrillation treatment and production of a cellulose fiber assembly (suction filtration and drying) in the same manner as in Example IV-1, and the resultant cellulose fiber assembly was subjected to cellulose-fiber composite material production therefrom (impregnation with resin solution, ultraviolet curing, and oven heating) in the same manner as in Example IV-1. Thus, a cellulose-fiber composite material was obtained.

The cellulose-fiber composite material obtained (thickness, 94 μm) had an average coefficient of linear expansion for 60-100° C. of 14.9 ppm/K.

Example IV-10

Production of Supernatant by Centrifugation, and Production of Cellulose Fiber Assembly and Cellulose-Fiber Composite Material from the Supernatant The dispersion of fibrillated cellulose fibers obtained in Example IV-9 through the fibrillation treatment of the cellulose fibers S was centrifuged in the same manner as in Example IV-2 to obtain a supernatant. This supernatant was subjected to production of a cellulose fiber assembly (suction filtration and drying) in the same manner as in Example IV-2, and the resultant cellulose fiber assembly was subjected to cellulose-fiber composite material production therefrom (impregnation with resin solution, ultraviolet curing, and oven heating) in the same manner as in Example IV-2. Thus, a cellulose-fiber composite material was obtained.

The cellulose-fiber composite material obtained (thickness, 161 μm) had a haze of 1.78, a total light transmittance of 87.25%, and a YI of 23.80. The overall yield thereof was determined in the same manner as in Example IV-2, and was found to be 15.0%.

Comparative Example IV-1

TEMPO Oxidation Treatment of Raw Cellulose Fibers

The same LBKP as used in Example I-1 was used as raw cellulose fibers. This LBKP had a carboxy group content of 0.06 mmol/g.

A 150 g portion of the LBKP (solid content, 20% by weight; water content, 80% by weight; 30 g in terms of absolute-dry cellulose) was dispersed in 2,500 mL of ion-exchanged water in which 3 g of sodium bromide and 0.48 g of a TEMPO catalyst (2,2,6,6-tetramethylpiperidine-1-oxy radical) had been dissolved.

The pH of 86.5 mL of a 64.5 g/L aqueous solution of sodium hypochlorite was adjusted to 10 with 0.1 M hydrochloric acid, and the resultant solution was added to the LBKP dispersed in the ion-exchanged water, thereby initiating a reaction. The reaction was conducted at room temperature.

During the reaction, although the pH declined gradually, 20 g/L aqueous sodium hydroxide solution was added on occasion to keep the pH at 10. At the time when 4 hours had passed since initiation of the reaction, the pH came not to decline. The reaction was hence terminated at this point of time.

After completion of the reaction, the cellulose fibers were suspension-washed with ion-exchanged water and this suspension washing was repeated until the pH of the washings became 8 or less. The suspension was vacuum-filtered with filter paper to obtain cellulose fibers Q (solid concentration, about 20% by weight).

Additional Oxidation Treatment

A 100 g portion of the cellulose fibers Q (20 g in terms of absolute-dry weight of cellulose fibers) was taken out, and 18 g of sodium hypochlorite, 60 g of acetic acid, and 700 mL of ion-exchanged water were added thereto. The pH of this mixture was adjusted to 4.5 with 20 g/L aqueous sodium hydroxide solution. Thereafter, the resultant mixture was held at room temperature for 48 hours to react the cellulose fibers.

After completion of the reaction, the cellulose fibers were suspension-washed with ion-exchanged water and this suspension washing was repeated until the pH of the washing became 6 or higher. The suspension was vacuum-filtered with filter paper to obtain cellulose fibers R (solid concentration, 14.3% by weight). The cellulose fibers R had a carboxy group content of 1.03 mmol/g (no formyl groups were detected).

Fibrillation Treatment, and Production of Cellulose Fiber Assembly and Cellulose-Fiber Composite Material The cellulose fibers R were added to water to obtain a 0.5% by weight aqueous suspension. This suspension was treated with a high-speed rotation type homogenizer ("Clearmix 0.8S", manufactured by M Technique Co., Ltd.) at 20,000 rpm for 1 hour to obtain a dispersion of fibrillated cellulose fibers.

The dispersion of fibrillated cellulose fibers was centrifuged in the same manner as in Example IV-2 to obtain a supernatant. This supernatant was subjected to production of a cellulose fiber assembly (suction filtration and drying) in the same manner as in Example IV-2, and the resultant cellulose fiber assembly was subjected to cellulose-fiber composite material production therefrom (impregnation with resin solution, ultraviolet curing, and oven heating) in the same manner as in Example IV-2. Thus, a cellulose-fiber composite material was obtained.

The cellulose-fiber composite material obtained (thickness, 95 µm) had a haze of 6.80, a total light transmittance of 12.56%, and a YI of 173.45.

can be made therein without departing from the spirit and scope thereof. This application is based on a Japanese patent application filed on Feb. 21, 2011 (Application No. 2011-34807) and a Japanese patent application filed on Feb. 20, 2012 (Application No. 2012-34061), the entire contents thereof being incorporated herein by reference.

INDUSTRIAL APPLICABILITY

The cellulose-fiber composite material provided according to the invention is highly transparent, has high strength, low water absorption, and high transparency, takes little color, and has a low haze and excellent optical properties. Consequently, the composite material is suitable for use in displays such as liquid-crystal displays, plasma displays, OLED displays, field emission displays, rear projection television receivers, etc., and as substrates or panels. The composite material is

TABLE 3A

| | Items concerning cellulose fibers | | | Property values of cellulose-fiber composite material | | | | |
|---|---|---|---|---|---|---|---|---|
| | Total content of carboxy and formyl groups (mmol/g) | Chemical modification group | Degree of substitution | Haze | Total light transmittance (%) | YI | Coefficient of linear expansion (ppm/K) | Item concerning recovery Overall yield (%) |
| Example IV-1 | 0.16 | acetyl | 0.61 | — | — | — | 11.5 | — |
| Example IV-2 | 0.16 | acetyl | 0.61 | 1.61 | 82.58 | 29.83 | — | 17.6 |
| Example IV-3 | 0.18 | acetyl | 0.75 | — | — | — | 13.5 | — |
| Example IV-4 | 0.18 | acetyl | 0.75 | 1.98 | 84.87 | 21.66 | — | 18.5 |
| Example IV-5 | 0.14 | acetyl | 0.91 | — | — | — | 13.3 | — |
| Example IV-6 | 0.14 | acetyl | 0.91 | 1.53 | 86.44 | 18.62 | — | 17.0 |
| Example IV-7 | 0.11 | benzoyl | 1.03 | — | — | — | 16.6 | — |
| Example IV-8 | 0.11 | benzoyl | 1.03 | 1.15 | 88.75 | 17.45 | — | 11.3 |
| Example IV-9 | 0.13 | propionyl | 0.53 | — | — | — | 14.9 | — |
| Example IV-10 | 0.13 | propionyl | 0.53 | 1.78 | 87.25 | 23.80 | — | 15.0 |

TABLE 3B

| | Items concerning cellulose fibers | | | Property values of cellulose-fiber composite material | | | |
|---|---|---|---|---|---|---|---|
| | Total content of carboxy and formyl groups (mmol/g) | Chemical modification group | Degree of substitution | Haze | Total light transmittance (%) | YI | Coefficient of linear expansion (ppm/K) |
| Comparative Example IV-1 | 1.03 | none | — | 6.80 | 12.56 | 173.45 | — |

The results given in Tables 3A and 3B also show that the cellulose-fiber composite materials obtained using cellulose fibers of the invention are excellent composite materials having high transparency, non-discoloring properties, high heat resistance, and a low coefficient of linear expansion. Furthermore, as can be seen from the high recovery (overall yield), the cellulose fibers of the invention attain excellent productivity.

While the invention has been described in detail and with reference to specific embodiments thereof, it will be apparent to one skilled in the art that various changes and modifications suitable also as substrates for solar cells such as silicon-based solar cells and dye-sensitized solar cells. For use as a substrate, the composite material may be laminated with a barrier film, ITO, TFT, etc.

The cellulose-fiber composite material of the invention is suitable also for use as windowpane materials for motor vehicles, windowpane materials for railroad vehicles, windowpane materials for dwelling houses, windowpane materials for offices or factories, and the like. In the case of use as a windowpane material, the composite material may be coated or laminated with a film, such as, for example, a fluororesin coating or a hardcoat film, or with an impact-resistant or light-resistant material according to need.

The invention claimed is:

1. Cellulose fibers having a number-average fiber diameter of 18-25 nm and comprising cellulose,
   wherein a part of the hydroxyl groups of the cellulose is substituted with at least one of a carboxy group and formyl group from 0.1 mmol/g to 1.0 mmol/g based on the weight of the cellulose fibers, and is further substituted with a chemical modification group other than the carboxy and formyl groups,
   wherein the chemical modification group is an acyl group, and
   wherein a degree of substitution with the chemical modification group is from 0.5 to 1.0.

2. The cellulose fibers of claim 1, wherein the degree of substitution with the chemical modification group is from 0.53-0.91.

3. The cellulose fibers of claim 1, wherein the degree of substitution with the chemical modification group is from 0.61-0.75.

4. The cellulose fibers of claim 3, wherein the chemical modification group is an acetyl group.

5. The cellulose fibers of claim 1, wherein the at least one of the carboxy group and formyl group has been introduced by an oxidation treatment.

6. The cellulose fibers of claim 1, wherein the cellulose fibers are obtained by purifying a cellulose-comprising material and substituting part of the hydroxyl groups of the cellulose-comprising material with at least one of a carboxy group and formyl group and with the chemical modification group, to obtain the cellulose.

7. The cellulose fibers of claim 1, wherein the chemical modification group is an acetyl group.

8. A cellulose fiber assembly, comprising:
   the cellulose fibers of claim 1.

9. A cellulose-fiber composite material, comprising:
   the cellulose fibers of claim 1; and
   a matrix material.

10. A process for producing cellulose fibers of claim 1, the process comprising:
    subjecting raw cellulose fibers to an oxidation treatment, a chemical modification treatment, and a fibrillation treatment.

* * * * *